(12) United States Patent
Lal et al.

(10) Patent No.: US 11,416,415 B2
(45) Date of Patent: Aug. 16, 2022

(54) TECHNOLOGIES FOR SECURE DEVICE CONFIGURATION AND MANAGEMENT

(71) Applicant: Intel Corporation, Santa Clara, CA (US)

(72) Inventors: Reshma Lal, Hillsboro, OR (US); Pradeep M. Pappachan, Hillsboro, OR (US); Luis Kida, Beaverton, OR (US); Krystof Zmudzinski, Forest Grove, OR (US); Siddhartha Chhabra, Portland, OR (US); Abhishek Basak, Hillsboro, OR (US); Alpa Narendra Trivedi, Hillsboro, OR (US); Anna Trikalinou, Hillsboro, OR (US); David M. Lee, Portland, OR (US); Vedvyas Shanbhogue, Austin, TX (US); Utkarsh Y. Kakaiya, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 458 days.

(21) Appl. No.: 16/444,053

(22) Filed: Jun. 18, 2019

(65) Prior Publication Data
US 2019/0311123 A1    Oct. 10, 2019

Related U.S. Application Data

(60) Provisional application No. 62/687,403, filed on Jun. 20, 2018.

(51) Int. Cl.
*G06F 12/14* (2006.01)
*H04L 9/32* (2006.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
CPC ............... G06F 12/1408; G06F 9/3877; G06F 9/45558; G06F 12/0802; G06F 21/57;
(Continued)

(56) References Cited

U.S. PATENT DOCUMENTS 7,523,097 B1 *   4/2009  Wilson ................ H04L 41/0856
2014/0047174 A1 * 2/2014  Sakthikumar ....... G06F 12/1416
                                                                711/105

(Continued)

*Primary Examiner* — Mohammad W Reza
(74) *Attorney, Agent, or Firm* — Jaffery Watson Mendonsa & Hamilton LLP

(57) ABSTRACT

Technologies for secure device configuration and management include a computing device having an I/O device. A trusted agent of the computing device is trusted by a virtual machine monitor of the computing device. The trusted agent securely commands the I/O device to enter a trusted I/O mode, securely commands the I/O device to set a global lock on configuration registers, receives configuration data from the I/O device, and provides the configuration data to a trusted execution environment. In the trusted I/O mode, the I/O device rejects a configuration command if a configuration register associated with the configuration command is locked and the configuration command is not received from the trusted agent. The trusted agent may provide attestation information to the trusted execution environment. The trusted execution environment may verify the configuration data and the attestation information. Other embodiments are described and claimed.

25 Claims, 15 Drawing Sheets

(51) Int. Cl.

| | |
|---|---|
| *G06F 21/76* | (2013.01) |
| *G06F 21/60* | (2013.01) |
| *H04L 9/08* | (2006.01) |
| *G06F 9/455* | (2018.01) |
| *G06F 21/57* | (2013.01) |
| *G06F 21/64* | (2013.01) |
| *H04L 41/28* | (2022.01) |
| *G06F 21/79* | (2013.01) |
| *H04L 41/046* | (2022.01) |
| *H04L 9/06* | (2006.01) |
| *G06F 9/38* | (2018.01) |
| *G06F 12/0802* | (2016.01) |

(52) U.S. Cl.
CPC .......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/085* (2013.01); *H04L 9/0838* (2013.01); *H04L 9/0844* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/046* (2013.01); *H04L 41/28* (2013.01); *G06F 2009/45591* (2013.01); *G06F 2009/45595* (2013.01)

(58) Field of Classification Search
CPC ...... G06F 21/602; G06F 21/606; G06F 21/64; G06F 21/76; G06F 21/79; G06F 2009/45591; G06F 2009/45595; H04L 9/0631; H04L 9/0637; H04L 9/083; H04L 9/0838; H04L 9/0844; H04L 9/085; H04L 9/0891; H04L 9/321; H04L 9/3215; H04L 9/3226; H04L 9/3268; H04L 9/3278; H04L 41/046; H04L 41/28
See application file for complete search history.

(56) References Cited

U.S. PATENT DOCUMENTS

2014/0304649 A1* 10/2014 Phegade ................. G06F 21/84
                                                    715/809
2021/0081577 A1* 3/2021 Zhang .................... H04L 9/3252

* cited by examiner

TECHNOLOGIES FOR SECURE DEVICE CONFIGURATION AND MANAGEMENT

CROSS-REFERENCE TO RELATED APPLICATION

The present application claims the benefit of U.S. Provisional Patent Application No. 62/687,403, filed Jun. 20, 2018.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in cleartext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
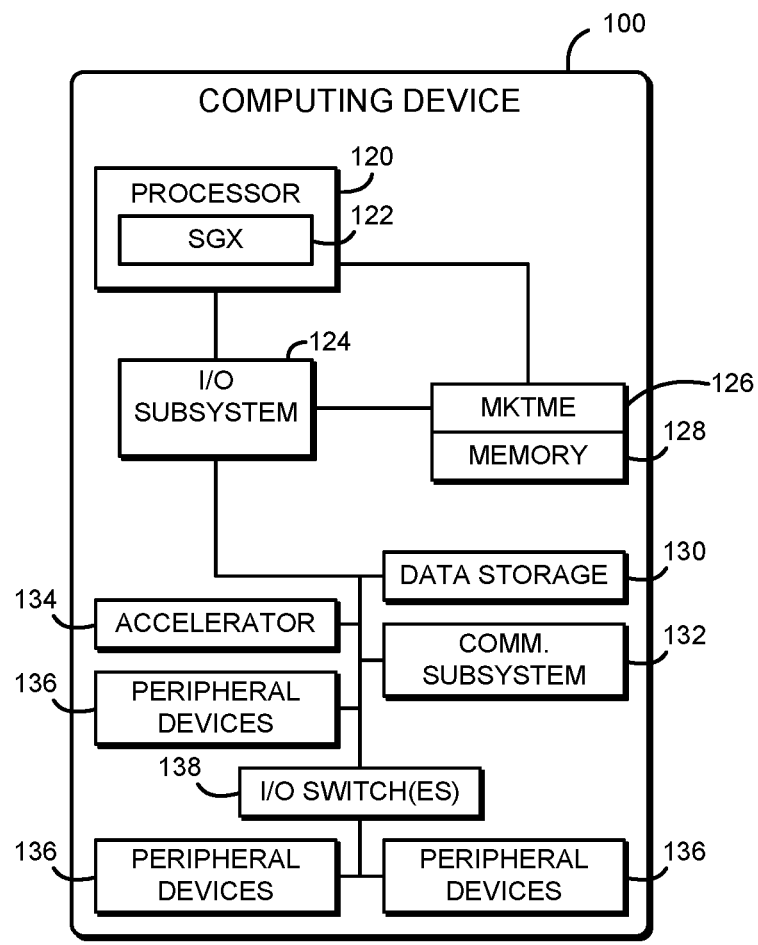
FIG. 1 is a simplified block diagram of at least one embodiment of a computing device for secure device configuration and management.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and one or more I/O devices. In use, as described further below, the computing device 100 includes a virtual machine monitor (VMM) and one or more trusted execution environments (TEE). The VMM and the TEE do not mutually trust each other (e.g., the VMM is not included in the trusted computing base (TCB) of the TEE). The computing device 100 further includes a trusted agent that is trusted by both the VMM and the TEE. The trusted agent verifies the identity of I/O devices capable of trusted I/O (TIO devices), provisions secrets to the TIO devices, locks, unlocks, and configures the TIO devices, and provides attestation information and device configuration information for the TIO device and the trusted agent to the TEE. Thus, the computing device 100 allows enables trusted I/O between a TIO device and a TEE by providing secure configuration and management of trusted I/O devices. The trusted agent operates under the overall control and management of the VMM while still providing assurances to the TEE that the TIO device is configured correctly and will operate as configured during trusted I/O. The computing device 100 does not require that the VMM be within the TCB of the TEE and is thus suitable for datacenter use or other multi-tenant systems.

The computing device 100 may be embodied as any type of device capable of performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes a processor 120, an I/O subsystem 124, a memory 128, and a data storage device 130. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 122 may be embodied as a set of processor instruction extensions that allows the processor 120 to establish one or more secure enclaves in the memory 128. For example, the secure enclave support 122 may be embodied as Intel® Software Guard Extensions (SGX) technology.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. As shown, the memory 128 is coupled to the processor 120 and/or the I/O subsystem 124 via a multi-key total memory encryption engine (MKTME) 126, which may be included in or otherwise coupled to a memory controller, integrated memory controller hub, or other memory interface. The MKTME 126 allows the computing device 100 to transparently encrypt the contents of the memory 128. The MKTME 126 maintains a table or other internal, protected structure with multiple encryption keys, which are used to encrypt and decrypt data as it is stored to and read from the memory 128, respectively. The encryption keys are illustratively 128-bit AES XTS keys although may be embodied as any symmetric, asymmetric, or other encryption key. The encryption key may be selected by the MKTME 126 on a per-page basis, for example based on a key identifier included in one or more otherwise unused upper bits of the physical memory page address for a particular memory access. In those embodiments, an operating system, virtual memory monitor, or other supervisory component of the computing device 100 may control access to particular memory pages by configuring one or more page tables and/or extended page tables with the appropriate key identifiers. MKTME keys may be generated by the MKTME 126, in which case they are not disclosed outside of the SoC, or may be supplied by software. In some embodiments, the MKTME 126 may include support for Intel Trust Domain Extensions (TDX). With TDX, the MKTME 126 may accept an external "domain" key, also called a "user" or "tenant" key. The MKTME 126 may also use a default key that is self-generated to protect memory used by MKTME and Intel SGX as well as Intel TDX from privileged adversaries on the platform. Although illustrated as coupled between the memory 128 and the processor 120 and I/O subsystem 124, it should be understood that in some embodiments, the MKTME 126 may be included in the processor 120, in the I/O subsystem 124, or other component of the computing device 100.

As shown, the processor 120 is communicatively coupled to the I/O subsystem 124, which may be embodied as circuitry and/or components to facilitate input/output operations with the processor 120, the memory 128, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the memory 128 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 128, the accelerator 134, and/or other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 128.

The data storage device 130 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 132, which may be embodied as any communication circuit, device, or collection thereof, capable of enabling communications between the computing device 100 and other remote devices over a computer network (not shown). The communications subsystem 132 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator 134 may be embodied as a field-programmable gate array (FPGA), an application-specific integrated circuit (ASIC), a graphics processor unit (GPU), a coprocessor, an I/O device, or other digital logic device capable of performing accelerated functions (e.g., accelerated application functions, accelerated network functions, or other accelerated functions). Illustratively, the accelerator 134 is an FPGA, which may be embodied as an integrated circuit including programmable digital logic resources that may be configured after manufacture. The FPGA may include, for example, a configurable array of logic blocks in communication over a configurable data interchange.

As shown, the computing device 100 may further include one or more peripheral devices 136. The peripheral devices 136 may include any number of additional input/output devices, interface devices, hardware accelerators, and/or other peripheral devices. For example, in some embodiments, the peripheral devices 136 may include a touch screen, graphics circuitry, a graphical processing unit (GPU) and/or processor graphics, an audio device, a microphone, a camera, a keyboard, a mouse, a network interface, and/or other input/output devices, endpoints, interface devices, and/or peripheral devices. As shown, one or more of the peripheral devices 136 may be coupled to the I/O subsystem 124 via corresponding I/O switches 138. The I/O switches 138 may be embodied as PCI Express (PCIe) switches, PCIe bridges, and/or other switching or routing components of the computing device 100. Thus, the computing device 100 may include a hierarchical system of connected I/O devices, switches, buses, links, and/or other I/O components.

Figure 2:
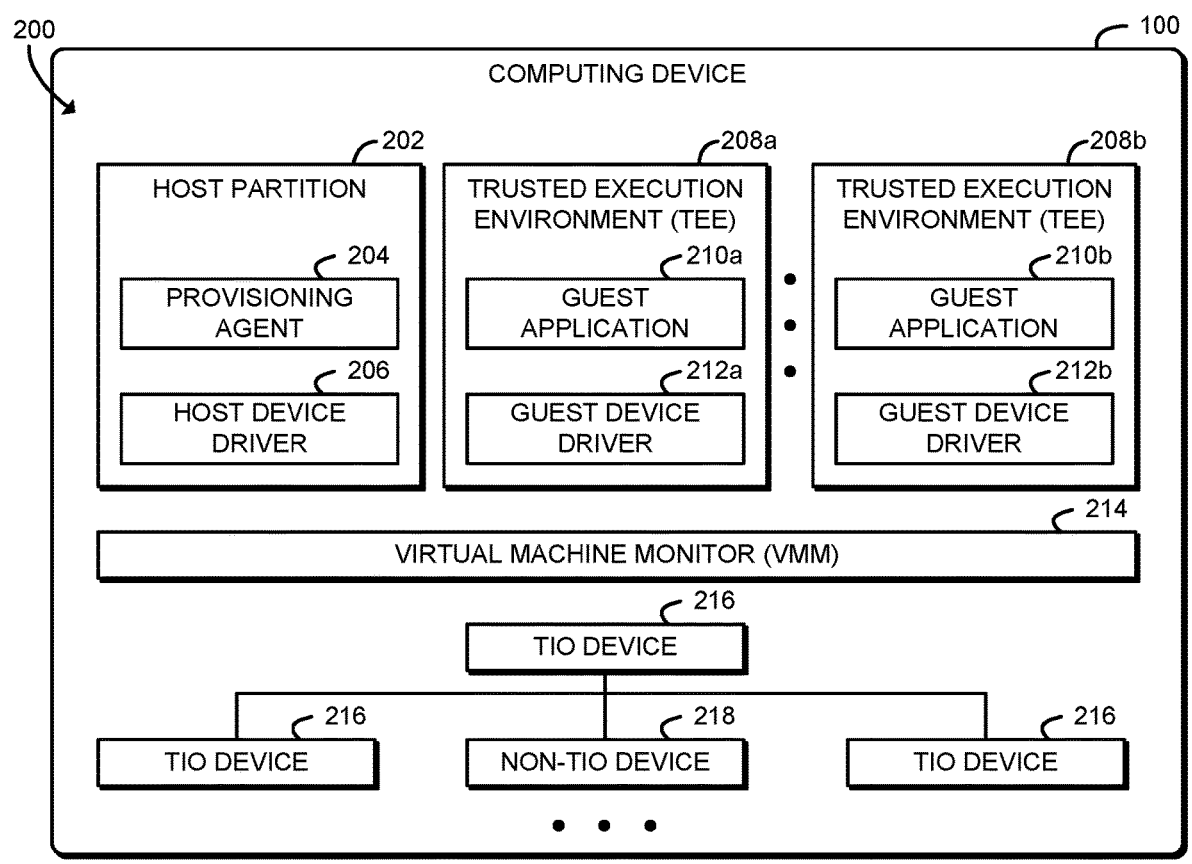
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a host partition 202 including a provisioning agent 204, multiple trusted execution environments (TEEs) 208, a virtual machine monitor (VMM) 214, and trusted I/O (TIO) devices 216. The various components of the environment 200 may be embodied as hardware, firmware, software, or a combination thereof. As such, in some embodiments, one or more of the components of the environment 200 may be embodied as circuitry or collection of electrical devices (e.g., provisioning agent circuitry 204, TEE circuitry 208, VMM circuitry 214, and/or TIO device circuitry 216). It should be appreciated that, in such embodiments, one or more of the provisioning agent circuitry 204, the TEE circuitry 208, the VMM circuitry 214, and/or the TIO device circuitry 216 may form a portion of the processor 120, the I/O subsystem 124, the accelerator 134, the peripheral devices 136, and/or other components of the computing device 100. Additionally, in some embodiments, one or more of the illustrative components may form a portion of another component and/or one or more of the illustrative components may be independent of one another.

The VMM 214 may be embodied as any virtual machine monitor, hypervisor, or other component that manages execution of one or more virtualized workloads on the computing device 100. The VMM 214 may manage workloads using hardware support of the processor 120, for example by executing in a privileged state such as VMX root, ring level−1, or another virtualization root mode. As described further below, the VMM 214 is responsible for managing hardware resources of the computing device 100, including the TIO devices 216. The VMM 214 is configured to launch the host partition 202 and/or the provisioning agent 204, and to launch the TEEs 208. The VMM 214 is configured to assign TIO devices 216 to particular TEEs 208. The VMM 214 may be configured to provide configuration commands to the TIO devices 216 as described below. The VMM 214 may be configured to enforce account permissions assigned to the provisioning agent 204. The VMM 214 may be configured to request the provisioning agent 204 to request that a TEE 208 releases an assigned TIO device 216.

The host partition 202 may be embodied as a root partition, host operating system, service virtual machine, or other partition of the computing device 100 that is trusted by the VMM 214 to access hardware of the computing device 100 (e.g., the TIO devices 216). As shown, the host partition 202 includes the provisioning agent 204 and one or more host device drivers 206. The provisioning agent 204 may be embodied as a trusted execution environment or other trusted agent of the computing device 100. The provisioning agent 204 executes as part of a user-mode service, daemon, or other process in a non-privileged execution mode (e.g., ring level 3 or other user mode). Illustratively, the provisioning agent 204 is a secure enclave established using Intel SGX technology. Each host device driver 206 may be embodied as an operating system driver, plugin, framework, or other system component that is configured to interact with and control the TIO devices 216. Each host device driver 206 may execute in kernel mode, ring level 0, or in another privileged execution mode. The host device drivers 206 have a communication channel to the provisioning agent 204 that may be used to service certain requests that originate from the TEE 208. For example, certain requests from paravirtualized guest device drivers 212 may be forwarded to the provisioning agent 204 for service (e.g., to provide attestation reports as described below). The provisioning agent 204 may also register with a plug-n-play (PnP) manager or other device hotplug manager of the host partition 202 to receive device change events, so the provisioning agent 204 can respond appropriately (e.g., by processing newly attached TIO devices 216).

The provisioning agent 204 is configured to securely command a TIO device 216 to enter a trusted I/O mode. Securely commanding the TIO device 216 may include protecting a configuration command with a provisioning key and providing the protected configuration command to the VMM 214. The VMM 214 provides the protected configuration command to the TIO device 216 as described above. The provisioning agent 204 is further configured to securely command the TIO device 216 to set a global lock on configuration registers and to receive in response configuration data indicative of the configuration registers of the TIO device 216. The provisioning agent 204 is further configured to securely command the TIO device 216 to atomically release the global lock and set a fine-grained lock on one or more of the configuration registers. The provisioning agent 204 is further configured to provide the configuration data to a TEE 208 in response setting the fine-grained lock.

The provisioning agent 204 may be further configured to perform an attestation protocol with the TIO device 216 to generate a device attestation report, verify the device attestation report, and securely provision the I/O device with the provisioning key in response to verifying the device attestation report. The provisioning agent 204 may be further configured to sign the device attestation report with a private key to generate a signed device attestation report, to include the signed device attestation report and a trusted agent attestation report in an attestation report; and to provide the combined attestation report to the TEE 208.

The provisioning agent 204 may be further configured to determine whether the TEE 208 has released the TIO device 216 and, in response, to securely command the TIO device 216 to release the fine-grained lock. The provisioning agent 204 may be further configured to determine whether any other trusted execution environment is using the TIO device 216 and securely command the TIO device 216 to exit the trusted I/O mode if no other TEE 208 is using the TIO device 216. The provisioning agent 204 may be further configured to receive a request to reclaim the I/O device from the VMM 214 and, in response, to request the TEE 208 to release the TIO device 216.

Each TIO device 216 may be embodied as an I/O device capable of secure configuration and trusted I/O operations as described further below. For example, the TIO devices 216 may include one or more data storage devices 130, network interface controllers 132, accelerators 134, peripheral devices 136, or other endpoint devices and/or one or more I/O switches 138 or other switches that connect endpoint devices to a root complex of the host. Each TIO device 216 is configured to receive a configuration command and to determine whether the configuration command is restricted to the provisioning agent 204. Configuration commands restricted to the provisioning agent 204 may include commands to enter or exit the trusted I/O mode, or commands to lock or unlock a configuration register. Each TIO device 216 is further configured to determine, for each configuration command restricted to the provisioning agent 204, whether the configuration command is received from the provisioning agent 204 and, if so, to process the configuration command and, if not, to reject the configuration command. The TIO device 216 may determine whether the configuration command is received from the provisioning agent 204 by determining whether the configuration command is protected by the provisioning key, as described above. Each TIO device 216 is further configured to determine, for each configuration command that is not restricted to the provisioning agent 204, whether the TIO device 216 is in the trusted I/O mode. If not the TIO mode, the TIO device 216 is configured to process the configuration command. If in the TIO mode, the TIO device 216 is further configured to determine whether a configuration register associated with the configuration command is locked and, if so, whether the configuration command is received from the provisioning agent 204. The TIO device 216 is configured to reject the configuration command if the configuration register is locked and the configuration command is not received from the provisioning agent 204. The TIO device 216 is configured to process the configuration command if the configuration register is not locked, or if the configuration register is locked and the configuration command is received from the provisioning agent 204.

As shown in FIG. 2, the TIO devices 216 may be included in a device tree such as a PCI Express (PCIe) device tree. The device tree may also include one or more non-TIO devices 218. Each non-TIO device 218 may be embodied as an I/O device (e.g., a data storage device 130, network interface controller 132, accelerator 134, peripheral device 136, and/or other endpoint, switch, or bridge device) that is not capable of secure configuration and trusted I/O operations.

Each of the TEEs 208 may be embodied as a trust domain, virtual machine, virtual network function (VNF), guest operating system, or other trusted environment of the computing device 100. Each TEE 208 is isolated or otherwise protected from the VMM 214, host partition 202, and other TEEs 208 with hardware support of the computing device 100. Thus, the VMM 214 is outside of the trusted computing base (TCB) of each TEE 208. Illustratively, each TEE 208 is a trust domain (TD) that is protected with the MKTME 126. As shown, each TEE 208 may include a guest application 210 and one or more guest device drivers 212. The guest device drivers 212 may access a paravirtualized application programming interface (API) or other interface supplied by a host device driver 206, the host partition 202, and/or the VMM 214. Each TEE 208 is configured to verify the attestation report received from the provisioning agent 204 and, in response, to request the provisioning agent 204 to prepare an assigned TIO device 216 for trusted I/O.

Figure 3:
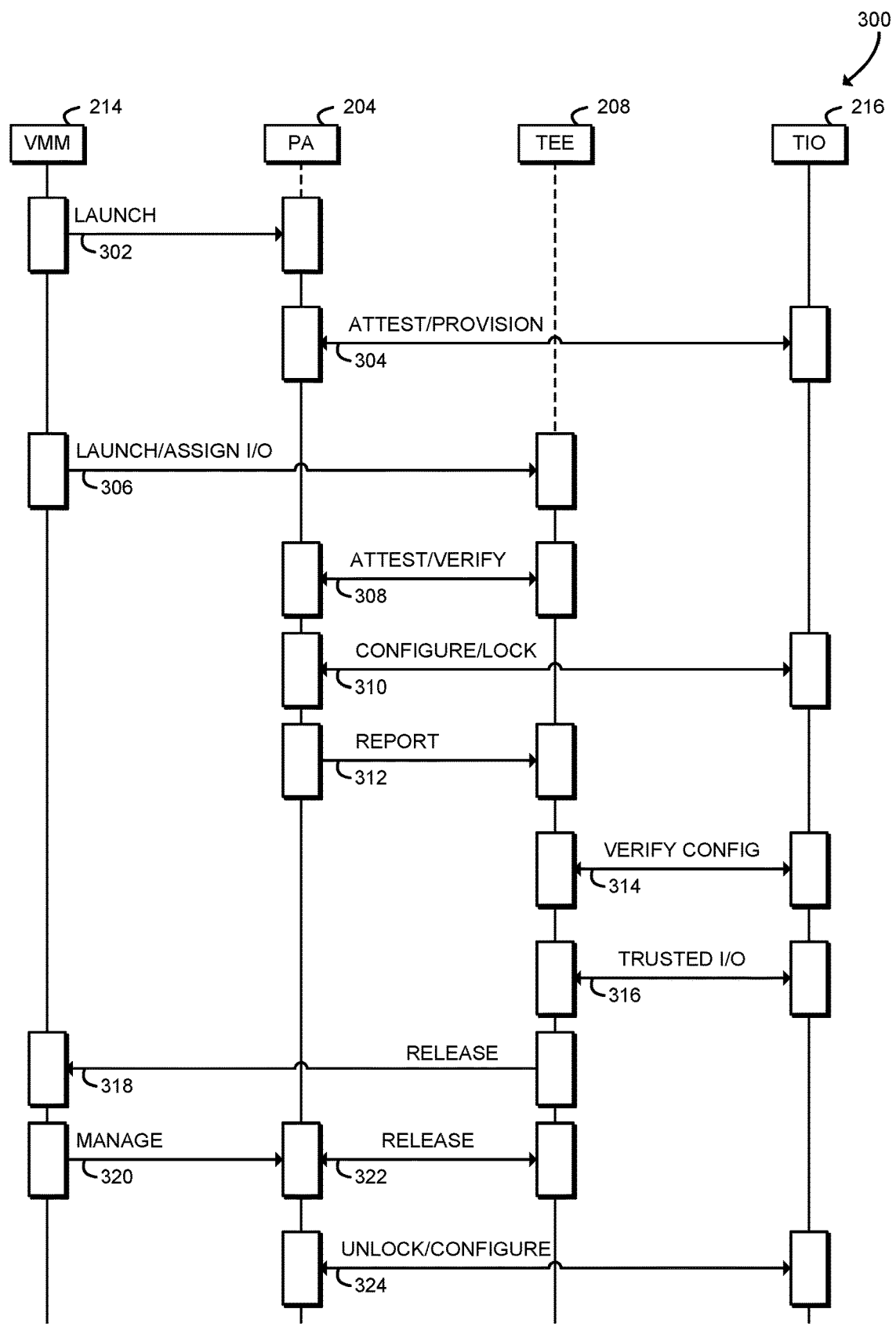
FIG. 3 is a simplified interaction diagram illustration at least one embodiment of a method for secure device configuration and management that may be executed by the computing device of FIGS. 1-2.
Figure 4:
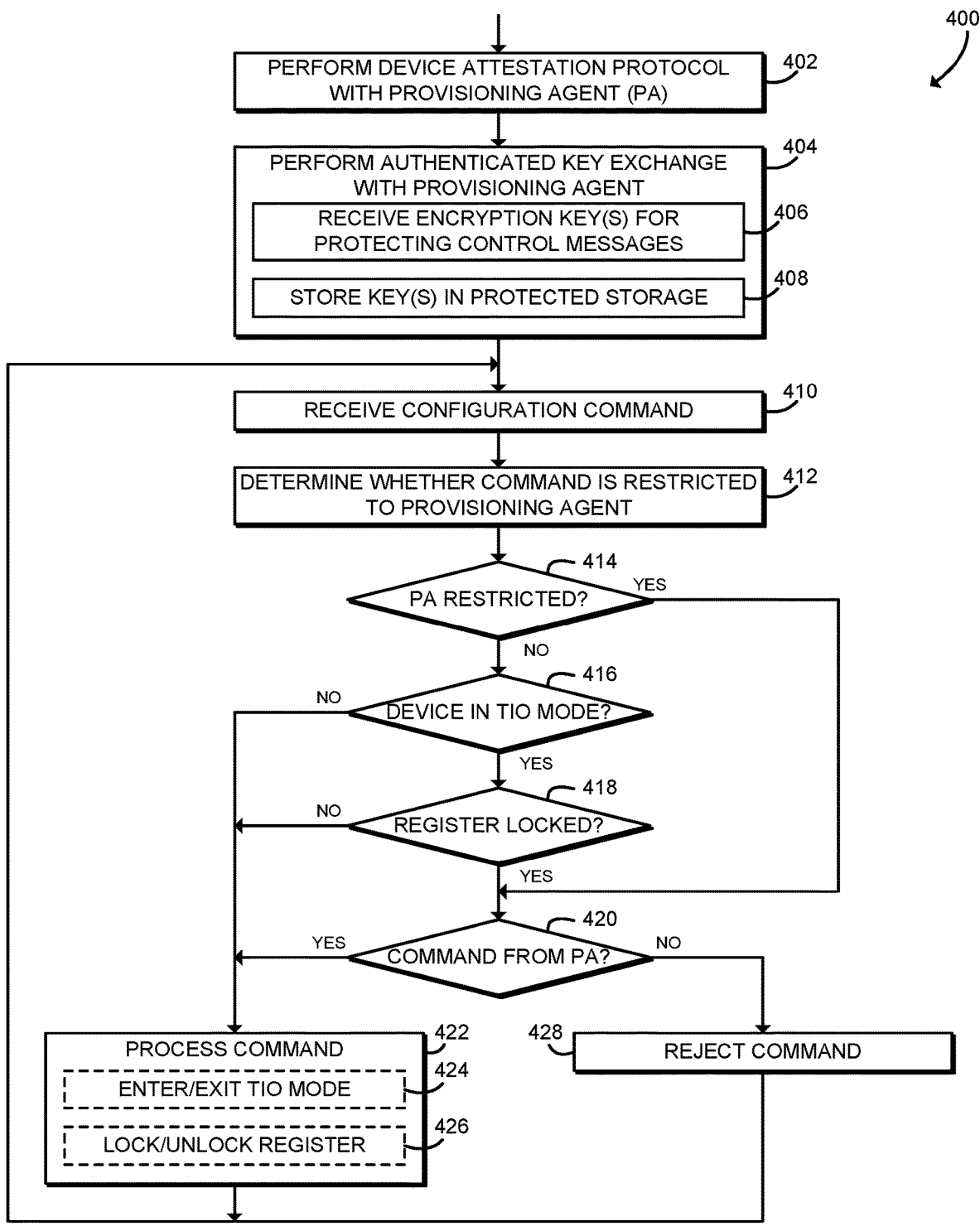
FIG. 4 is a simplified flow diagram of at least one embodiment of a method for secure configuration command processing that may be executed by an I/O device of the computing device of FIGS. 1-2.
Figure 6:
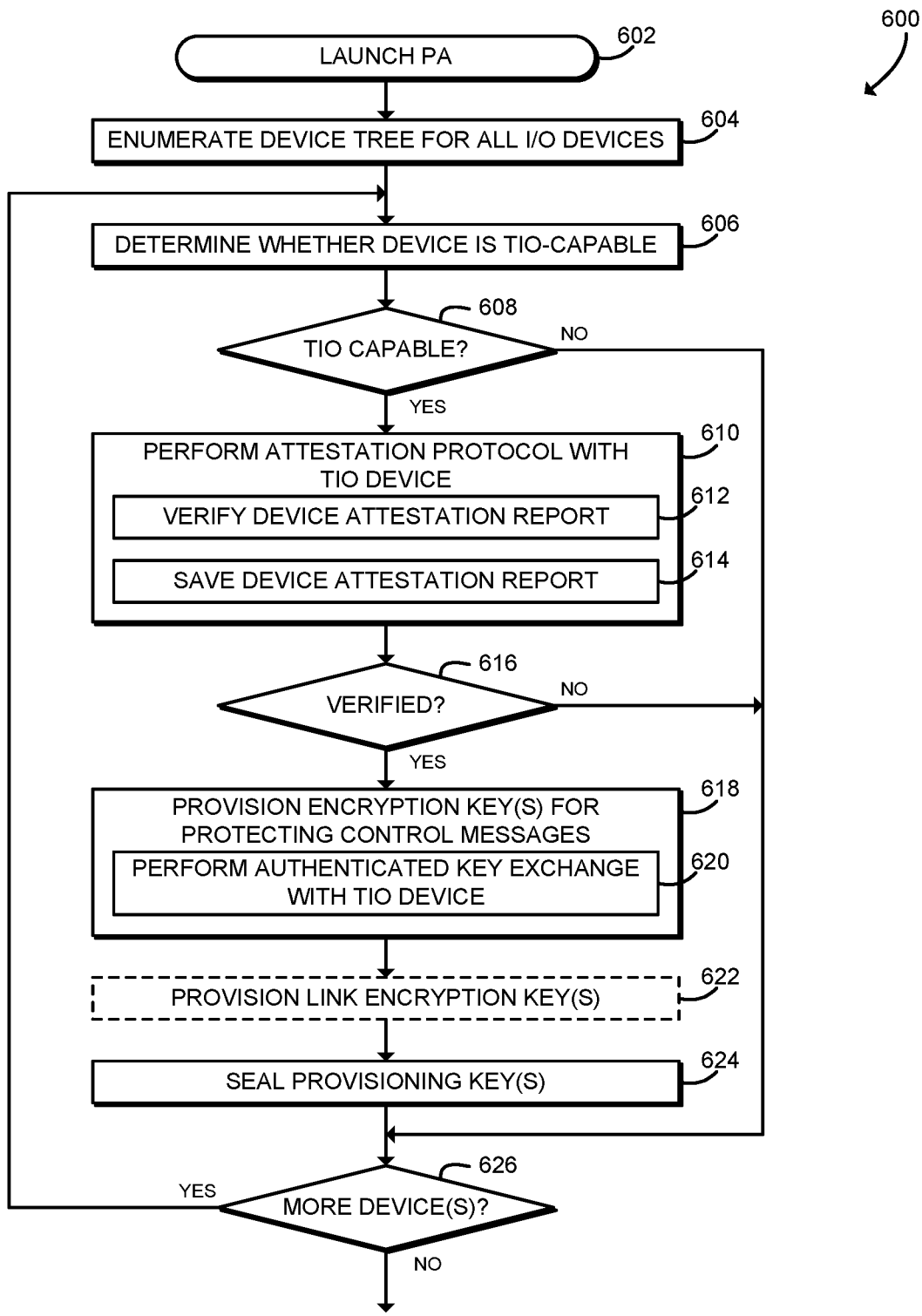
FIG. 6 is a simplified flow diagram of at least one embodiment of a method for secure device enumeration and attestation that may be executed by the computing device of FIGS. 1-2.

Referring now to FIG. 3, interaction diagram 300 illustrates a method for secure device configuration and management that may be executed by the computing device 100. It should be appreciated that, in some embodiments, the operations of the method shown in the interaction diagram 300 may be performed by one or more components of the environment 200 of the computing device 100 as shown in FIG. 2. The interaction diagram 300 begins with interaction 302, in which the VMM 214 launches the provisioning agent 204. The VMM 214 loads the provisioning agent 204 with a particular account or other permissions and thus trusts the provisioning agent 204. In interaction 304, the provisioning agent 204 performs an attestation and provisioning process with a TIO device 216. Potential embodiments of methods for attestation and provisioning that may be executed by the computing device 100 are illustrated in FIGS. 4 and 6 and described further below.

Figure 7:
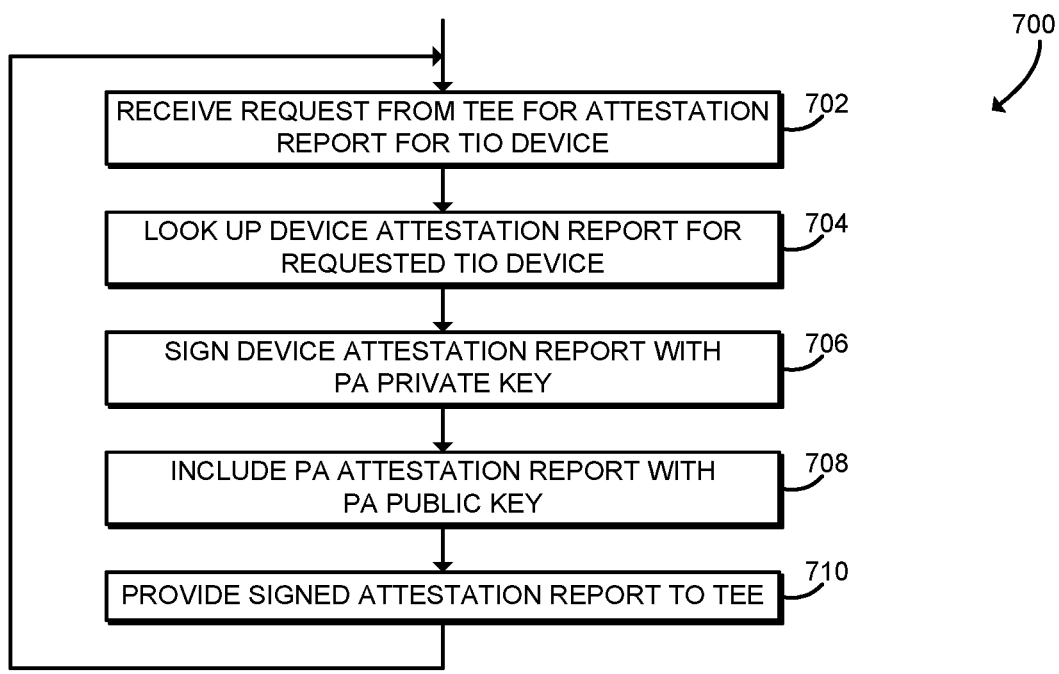
FIG. 7 is a simplified flow diagram of at least one embodiment of a method for secure device and trusted agent attestation that may be executed by the computing device of FIGS. 1-2.
Figure 9:
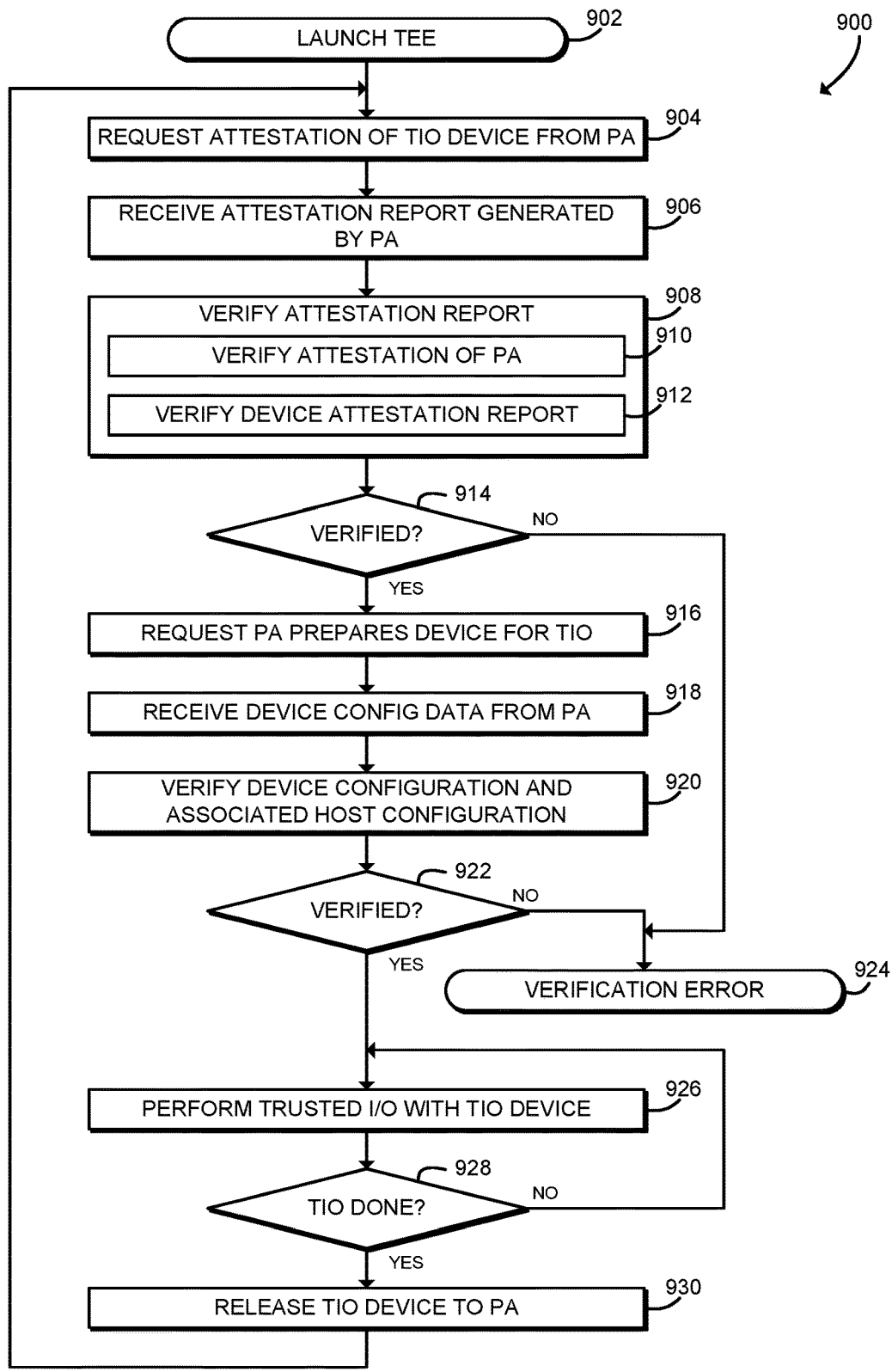
FIG. 9 is a simplified flow diagram of at least one embodiment of a method for secure device configuration and trusted I/O that may be executed by the computing device of FIGS. 1-2.

In interaction 306, the VMM 214 launches the TEE 208 and assigns the TIO device 216 to the TEE 208. In interaction 308, the provisioning agent 204 and the TEE 208 perform an attestation and provisioning process. After attestation and provisioning, the provisioning agent 204 is trusted by the TEE 208. Thus, the provisioning agent 204 is trusted by the both the VMM 214 and the TEE 208, but the VMM 214 may remain outside of the trusted computing base (TCB) of the TEE 208. Potential embodiments of methods for attestation and provisioning that may be executed by the computing device 100 are illustrated in FIGS. 7 and 9 and described further below.

Figure 8:
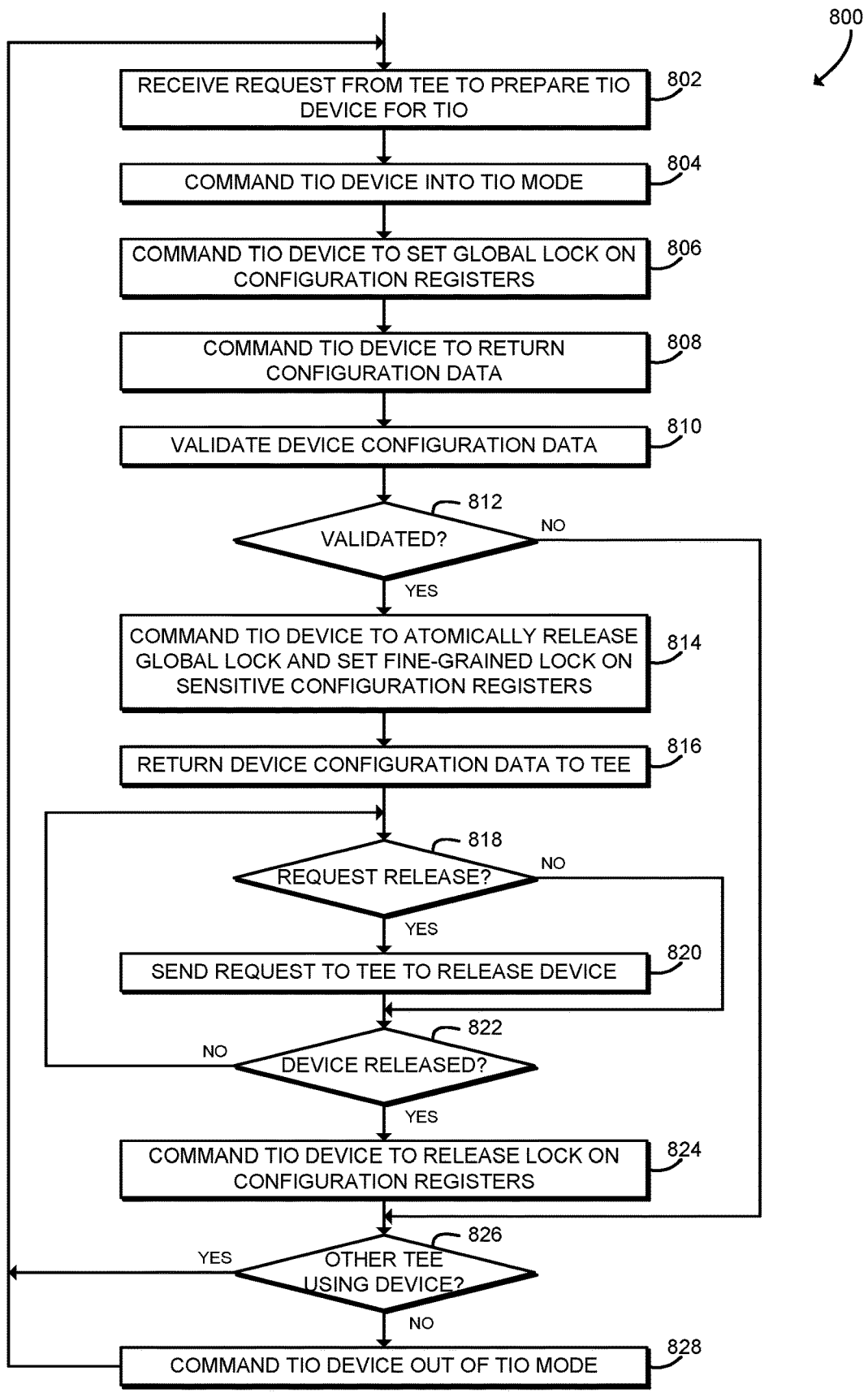
FIG. 8 is a simplified flow diagram of at least one embodiment of a method for secure device configuration that may be executed by the computing device of FIGS. 1-2.

In interaction 310, the provisioning agent 204 locks the configuration of the TIO device 216 and reads configuration data from the TIO device 216. In interaction 312, the provisioning agent 204 sends an attestation/configuration report to the TEE 208. Potential embodiments of methods for locking the device configuration are illustrated in FIGS. 4 and 8 and described further below. In interaction 314, the TEE 208 verifies the configuration of the TIO device 216. Potential embodiments of a method for verifying device configuration are illustrated in FIG. 9 and described further below. After verifying the device configuration, in interaction 316 the TEE 208 and the TIO device 216 perform trusted I/O.

Figure 5:
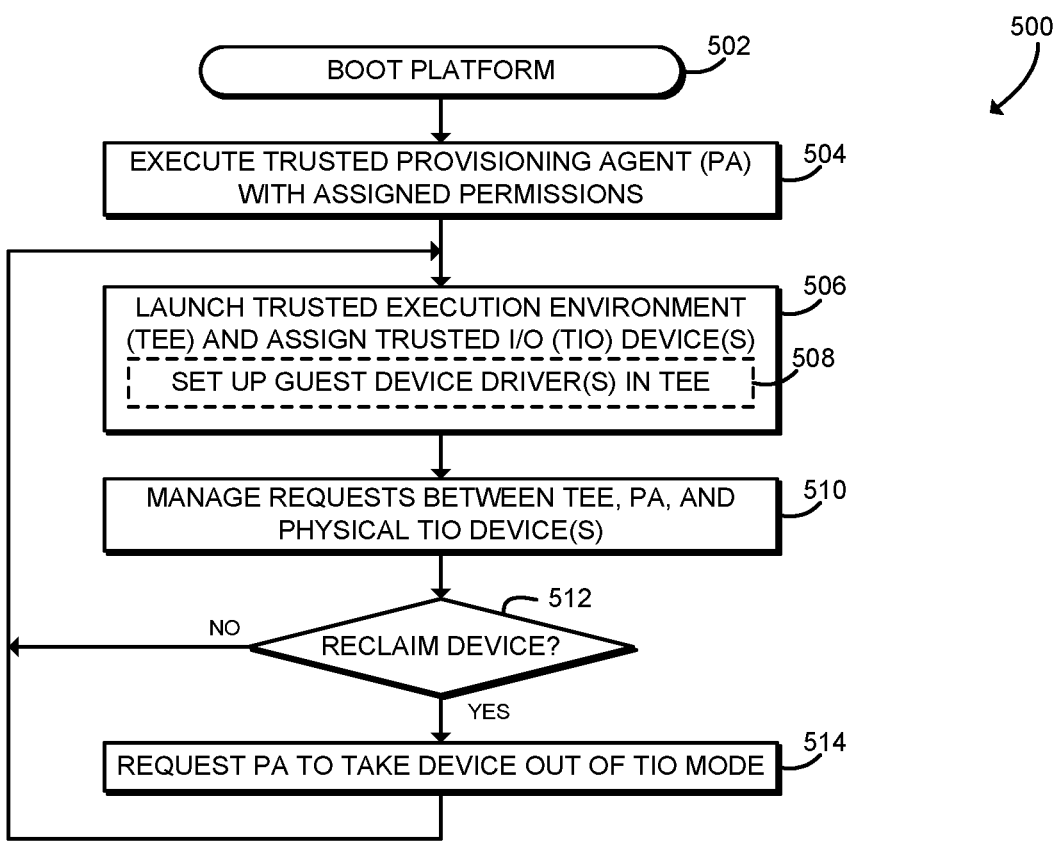
FIG. 5 is a simplified flow diagram of at least one embodiment of a method for secure device management that may be executed by the computing device of FIGS. 1-2.

In interactions 318, 320, 322, the VMM 214, the provisioning agent 204, and the TEE 208 manage trusted I/O access with the TIO device 216. In interaction 318, the TEE 208 may release the TIO device to the VMM 214, for example when finished with an I/O session or otherwise done accessing the TIO device 216. In interaction 320, the VMM 214 may request that the provisioning agent 204 cause the TEE 208 to release the TIO device 216. Additionally or alternatively, in interaction 322 the TEE 208 may release the TIO device 216 to the provisioning agent 204, for example when finished with an I/O session or otherwise done accessing the TIO device 216. After the TIO device 216 is released, in interaction 324 the provisioning agent 204 unlocks or otherwise configures the TIO device 216 to allow use by other components of the computing device 100. Thus, the VMM 214 may manage and otherwise maintain control over hardware components of the computing device 100 such as the TIO device 216. Potential embodiments of methods for securely managing TIO devices 216 are illustrated in FIGS. 5, 8, and 9 and described further below.

Referring now to FIG. 4, in use, the computing device 100 may execute a method 400 for secure configuration command processing. It should be appreciated that, in some embodiments, the operations of the method 400 may be performed by one or more components of the environment 200 of the computing device 100 as shown in FIG. 2, such as by a TIO device 216. For example, the method 400 may be executed by an I/O endpoint such as the accelerator 134 or a peripheral device 136, or by an I/O switch 138. The method 400 begins with block 402, in which the TIO device 216 performs a device attestation protocol with the provisioning agent (PA) 204. As part of the device attestation protocol, the TIO device 216 may provide an attestation report to the PA 204 that includes one or more verifiable assertions such as the identity, type, manufacturer, firmware version, or other attributes of the TIO device 216. The TIO device 216 and the PA 204 may perform any attestation protocol, such as PCIe attestation.

In block 404, the TIO device 216 performs an authenticated key exchange protocol with the PA 204, such as an authenticated Diffie-Hellman key exchange. In block 406, the TIO device 216 receives one or more encryption keys that may be used for protecting control messages. Illustratively, the TIO device 216 and the PA 204 exchange a shared secret key $K_a$. The TIO device 216 receives a provisioning key $K_p$ from the PA 204 that is wrapped by the key $K_a$. As described further below, control messages may be protected by the provisioning key $K_p$. In block 408, the TIO device 216 stores the encryption keys (e.g., $K_a$ and $K_p$) in protected storage accessible to the TIO device 216. For example, the keys may be stored in private memory of the TIO device 216.

In block 410, the TIO device 216 receives a configuration command. The configuration command may be embodied as an access to a configuration space, configuration register, or other configuration mechanism of the TIO device 216. The configuration command may be issued from software executed by the processor 120 such as operating systems, device drivers, and/or application software. For example, as described further below, a valid configuration command may be generated by the PA 204 and issued to the TIO device 216 via the host device driver 206, the VMM 214, or other supervisory component of the computing device 100.

In block 412, the TIO device 216 determines whether the configuration command is restricted to being performed by the PA 204. Certain sensitive configuration commands may only be originated from the PA 204 and not by other entities, such as the VMM 214 and/or host device driver 206. Illustratively, commands to enter or exit trusted I/O (TIO) mode and commands to lock or unlock configuration registers are restricted to the PA 204. In block 414, the TIO device 216 checks whether the command is restricted to the PA 204. If so, the method 400 branches ahead to block 420, described below. If the command is not restricted to the PA 204, the method 400 advances to block 416.

In block 416, the TIO device 216 determines whether the TIO device 216 is operating in the TIO mode. As described further below, the TIO device 216 may be commanded into and out of the TIO mode by the PA 204. If the TIO device 216 is not operating in TIO mode, the method 400 branches to block 422, described below. If the TIO device 216 is operating in the TIO mode, the method 400 advances to block 418. In block 418, the TIO device 216 determines whether the target register of the configuration command (e.g., an identified register in a configuration space of the TIO device 216) is locked. As described further below, the TIO device 216 may be commanded to lock and unlock particular registers by the PA 204. If the register is not locked, the method 400 branches to block 422, described below. If the register is locked, the method 400 advances to block 420.

In block 420, the TIO device 216 determines whether the configuration command originated from the PA 204. The TIO device 216 may, for example, determine whether the configuration command has been encrypted, signed, or otherwise protected with the provisioning key $K_p$. In some embodiments, the configuration command may be created and protected by the PA 204 and then submitted to the host device driver 206 and/or the VMM 214 for submission to the TIO device 216. In those embodiments, verifying the command with the provisioning key $K_p$ may ensure that the configuration command originates from the PA 204 and has not been altered. If the configuration command originates from the PA 204, the method 400 branches to block 422, described below. If the configuration command does not originate from the PA 204, the method 400 branches to block 428, in which the TIO device 216 rejects the configuration command. The TIO device 216 may, for example, prevent changes to the configuration space of the TIO device 216 or otherwise reject the configuration command. After rejecting the command, the method 400 loops back to block 410 to receive additional configuration commands.

Referring back to blocks 416, 418, 420, if the TIO device 216 is not in TIO mode, if the target register of the configuration command is not locked, or if the configuration command originates from the PA 204, the method 400 branches to block 422. In block 422, the TIO device 216 processes or otherwise accepts the configuration command. The TIO device 216 may change the configuration space of the TIO device 216 or perform other actions in response to the configuration command. In some embodiments, in block 424 the TIO device 216 may enter or exit the TIO mode based on the configuration command. As described above, when operating in the TIO mode, the TIO device 216 may perform certain additional checks before processing configuration commands. In some embodiments, in block 426, the TIO device 216 may lock or unlock a configuration register identified in the configuration command. As described above, when a register is locked, commands to change that register may be allowed only from the PA 204. After processing the configuration command, the method 400 loops back to block 410 to receive additional configuration commands.

Referring now to FIG. 5, in use, the computing device 100 may execute a method 500 for secure device management. It should be appreciated that, in some embodiments, the operations of the method 500 may be performed by one or more components of the environment 200 of the computing device 100 as shown in FIG. 2, such as the VMM 214. The method 500 begins with block 502, in which the computing device 100 boots. The computing device 100 may boot in response to a platform power on, reboot, or other power cycle event. In response to the boot event, the computing device 100 loads the VMM 214, host partition 202, and/or other privileged components of the computing device 100. The VMM 214 and/or host partition 202 may perform physical device discovery and enumeration (e.g., PCIe enumeration) to enumerate TIO devices 216 and load corresponding host device drivers 206.

In block 504, the computing device 100 executes a trusted provisioning agent (PA) 204 with assigned permissions. As described above, the PA 204 may be embodied as any trusted execution environment (TEE) or other trusted agent of the computing device 100 that is trusted by the VMM 214. The provisioning agent 204 may be launched as part of a user-mode service, daemon, or other process in a non-privileged execution mode (e.g., ring level 3 or other user mode). Illustratively, the PA 204 is a secure enclave established using the secure enclave support 122 (e.g., with Intel SGX technology). Thus, the PA 204 protects its code and data from privileged adversaries, for example using the secure enclave support 122. The illustrative PA 204 executes within a user process executed by the host partition 202. The PA 204 is executed within a particular predetermined operating system account or with other predetermined permissions that are enforced by the VMM 214. Thus, the PA 204 is trusted by the VMM 214.

In block 506 the VMM 214 computing device 100 launches a trusted execution environment (TEE) 208 and assigns one or more TIO devices 216 to that TEE 208.

Illustratively, the TEE 208 is a trust domain enforced with the MKTME 126. Accordingly, the contents of the TEE 208 are protected in hardware from the VMM 214 and from other TEEs 208. The computing device 100 may use any technique to assign the TIO devices 216 to the TEE 208. In some embodiments, in block 508 the VMM 214 may set up one or more guest device drivers 212 in the TEE 208. The guest device drivers 212 may be embodied as paravirtualized drivers or other components that communicate with a corresponding host device driver 206 or other component of the host partition 202 and/or the VMM 214.

In block 510, the VMM 214 manages requests issued between the TEE 208, the PA 204, and the physical TIO device 216. As described further below, the PA 204 and the TEE 208 may securely configure the TIO device 216 and then perform trusted I/O between the TEE 208 and the TIO device 216. During those interactions, the VMM 214 manages direct access to hardware such as the TIO devices 216. Commands between the TEE 208 and the PA 204 may be transferred or otherwise processed by components of the VMM 214, the host partition 202, and/or the host device driver 206. To maintain control over the TIO device 216, the VMM 214 may drop or otherwise deny commands that are submitted by the TEE 208 and/or the PA 204. However, as described further below, the VMM 214 may not alter or, in some embodiments, read the contents of those commands.

In block 512, the VMM 214 determines whether to reclaim a TIO device 216 from the TEE 208. As described further below, while performing trusted I/O, the TIO device 216 does not accept any configuration changes that do not originate from the provisioning agent 204. In order to regain complete control of the TIO device 216, the VMM 214 must reclaim the TIO device 216. A TIO device 216 may be reclaimed, for example, in order to allow the VMM 214 to assign the device to another TEE 208. If the VMM 214 determines not to reclaim the TIO device 216, the method 500 loops back to block 506, in which the VMM 214 may launch additional TEEs 208 and manage additional TIO devices 216. If the VMM 214 determines to reclaim the TIO device 216, the method 500 advances to block 514.

In block 514, the VMM 214 requests the PA 204 to take the TIO device 216 out of TIO mode. As described further below, the PA 204 may request the TEE 208 to release the TIO device 216 or otherwise ensure that the TIO device 216 is no longer in use by any TEE 208. After taking the TIO device 216 out of the TIO mode, the VMM 214 may have complete control over the configuration of the TIO device 216. For example, the TIO device 216 may be assigned by the VMM 214 to a different TEE 208. After taking the TIO device 216 out of the TIO mode, the method 500 loops back to block 506, in which the VMM 214 may launch additional TEEs 208 and manage additional TIO devices 216.

Referring now to FIG. 6, in use, the computing device 100 may execute a method 600 for secure device enumeration and attestation. It should be appreciated that, in some embodiments, the operations of the method 600 may be performed by one or more components of the environment 200 of the computing device 100 as shown in FIG. 2, such as the PA 204. The method 600 begins with block 602, in which the computing device 100 launches the PA 204. The PA 204 may be launched by the VMM 214 as described above in connection with block 504 of FIG. 5.

In block 604, the PA 204 enumerates a device tree for all I/O devices coupled to the computing device 100. For example, the PA 204 may enumerate all PCI buses, switches, bridges, and/or endpoints connected to a root complex of the computing device 100. The PA 204 may enumerate the I/O devices using a user mode API provided by the host partition 202 and/or the VMM 214.

In block 606, the PA 204 determines whether a current I/O device of the device tree is capable of trusted I/O (TIO). The PA 204 may use any technique to determine whether the device is TIO-capable (i.e., if the I/O device is a TIO device 216 and not a non-TIO device 218). For example, the PA 204 may read one or more predetermined registers from a configuration space of the I/O device that indicate whether the I/O device is TIO-capable. The register may indicate that the TIO-capable device 216 provides a secure device configuration interface to host software, including that the TIO device 216 is capable of performing an authenticated key exchange and is capable of being provisioned with a key for receiving encrypted and integrity protected control messages from the PA 204. In block 608 the PA 204 checks whether the current I/O device is TIO-capable. If not (e.g., if the current I/O device is a non-TIO device 218), the method 600 branches ahead to block 626, described below. If the current I/O device is TIO-capable, the method 600 advances to block 610.

In block 610, the PA 204 performs an attestation protocol with the current TIO device 216. The PA 204 and the TIO device 216 may perform any appropriate attestation protocol, such as PCIe attestation. As part of the attestation protocol, the PA 204 receives an attestation report from the TIO device 216 that includes one or more verifiable assertions such as the type, manufacturer, firmware version, or other attributes of the TIO device 216. In block 612, the PA 204 verifies the device attestation report. The PA 204 may verify that the device attestation report is authentic, for example by verifying one or more digital signatures of the report. The PA 204 may also verify one or more attributes of the TIO device 216 included in the device attestation report. For example, the PA 204 may verify that the TIO device 216 has an allowed firmware version or other device attribute. In block 614, the PA 204 saves the device attestation report. The device attestation report may be saved in an in-memory data structure that is protected from unauthorized disclosure or alteration, for example using the secure enclave support 122 of the processor 120. In other embodiments, the device attestation report may be saved in secure storage accessible to the PA 204.

In block 616, the PA 204 determines whether the TIO device 216 was successfully verified. If not, the method 600 branches ahead to block 626, described below. If the TIO device 216 was successfully verified, the method 600 advances to block 618.

In block 618, the PA 204 provisions one or more encryption keys to the TIO device 216. As described above, those encryption keys may be used for protecting control messages issued by the PA 204 to the TIO device 216 and corresponding responses. The PA 204 may use any technique to securely provision the encryption keys. In some embodiments, in block 620 the PA 204 may perform an authenticated key exchange protocol with the TIO device 216, such as an authenticated Diffie-Hellman key exchange. Illustratively, the TIO device 216 and the PA 204 exchange a shared secret key $K_a$. The PA 204 then wraps a provisioning key $K_p$ with the key $K_a$ and provides the wrapped provisioning key $K_p$ to the TIO device 216. As described above, control messages and responses may be integrity-protected using the provisioning key $K_p$.

In some embodiments, in block 622 the PA 204 may securely provision one or more link encryption keys to the TIO device 216. The link encryption keys may be used to protect I/O data transferred to and/or from the TIO device 216 from certain hardware attacks. The link encryption keys may be different from the provisioning key $K_p$ used to protect configuration commands.

In block 624, the PA 204 seals (e.g., encrypts) the provisioning keys (e.g., $K_a$ and $K_p$) and securely stores the sealed keys. For example, the PA 204 may encrypt $K_a$ and $K_p$ with an enclave sealing key provided by the secure enclave support 122 of the processor 120. Sealing the keys $K_a$ and $K_p$ may allow the PA 204 to recover the provisioned TIO devices 216 in response to unexpected crashes, resets, power cycles, or other events.

In block 626, the PA 204 determines whether additional I/O devices remain for attestation. For example, the PA 204 may select additional I/O devices by traversing a device tree as described above. If additional I/O devices remain, the method 600 loops back to block 606 to continue processing I/O devices. If no additional I/O devices remain, the method 600 is completed. After completing the method 600, the PA 204 may provide device attestation information to one or more TEEs 208 as described below in connection with FIG. 7.

Referring now to FIG. 7, in use, the computing device 100 may execute a method 700 for secure device and trusted agent attestation. It should be appreciated that, in some embodiments, the operations of the method 700 may be performed by one or more components of the environment 200 of the computing device 100 as shown in FIG. 2, such as the PA 204. The method 700 begins with block 702, in which the PA 204 receives a request from a TEE 208 for an attestation report associated with a TIO device 216. The PA 204 may receive the request from the TEE 208 via a host device driver 206 or other components of the computing device 100. For example, the TEE 208 may generate the request for the attestation report by accessing a paravirtualized guest device driver 212, which in turn accesses a corresponding host device driver 206 in the host partition 202. The host device driver 206 may forward the request to the PA 204 for servicing.

In block 704, the PA 204 looks up the device attestation report for the requested TIO device 216. As described above in connection with FIG. 6, the PA 204 has previously enumerated and performed an attestation protocol with all TIO devices 216. Thus, the PA 204 maintains a data structure that includes device attestation reports for each TIO device 216, as well as information on which devices have been attested and provisioned and how the devices are connected to each other (the topology).

In block 706, the PA 204 signs the device attestation report with a private key associated with the PA 204. In block 708, the PA 204 adds an attestation report associated with the PA 204 to the device attestation report. The PA attestation report includes one or more verifiable assertions such as the identity, signature, vendor, authority, or other attributes of the PA 204. In some embodiments, the PA attestation report may be generated using hardware support of the computing device 100. For example, the PA attestation report may be generated using one or more processor instructions to perform an SGX local or remote attestation protocol. The PA attestation report may also include a public key and/or certificate of the PA 204.

In block 710, the PA 204 provides the combined, signed attestation report to the TEE 208. The PA 204 may provide the signed attestation report to the TEE 208 via the host device driver 206 or other components of the computing device 100. For example, the PA 204 may provide the signed report to the host device driver 206, which in turn may provide the response to the paravirtualized guest device driver 212 of the TEE 208. As described further below in connection with FIG. 9, the TEE 208 (e.g., the paravirtualized guest device driver 212, the guest application 210, or other component of the TEE 208) may use the signed attestation report to verify both the PA 204 and the TIO device 216. After providing the attestation report, the method 700 loops back to block 702, in which the PA 204 may receive additional requests for attestation reports.

Referring now to FIG. 8, in use, the computing device 100 may execute a method 800 for secure device configuration. It should be appreciated that, in some embodiments, the operations of the method 800 may be performed by one or more components of the environment 200 of the computing device 100 as shown in FIG. 2, such as the PA 204. The method 800 begins with block 802, in which the PA 204 receives a request from the TEE 208 to prepare a TIO device 216 for trusted I/O. The request may be received after the PA 204 has attested and verified both the TEE 208 and the TIO device 216. The PA 204 may receive the request from the TEE 208 via a host device driver 206 or other components of the computing device 100. For example, the TEE 208 may generate the request for trusted I/O by accessing a paravirtualized guest device driver 212, which in turn accesses a corresponding host device driver 206 in the host partition 202. The host device driver 206 may forward the request to the PA 204 for servicing.

In block 804, the PA 204 commands the TIO device 216 into the TIO mode. As described above in connection with FIG. 4, the PA 204 may send a configuration command to the TIO device 216 that includes the command to enter the TIO mode. The PA 204 indicates that the command originates with the PA 204, for example by encrypting, signing, or otherwise protecting the configuration command with the provisioning key $K_p$. The TIO device 216 verifies that the configuration command originates with the PA 204 as described above.

The VMM 214 retains the ability to approve or disapprove all configuration commands sent by the PA 204 to the TIO device 216. For example, the PA 204 may send configuration commands to the TIO device 216 via the host device driver 206, which in turn may access the TIO device 216 using the host partition 202 and/or the VMM 214. Thus, the host partition 202 and/or the VMM 214 may block any configuration commands to the TIO device 216 at the physical driver level, which allows the VMM 214 to remain in control of the physical resources of the computing device 100. If any configuration command is blocked by the host partition 202 and/or the VMM 214, TIO operations may be aborted.

In block 806, the PA 204 commands the TIO device 216 to set a global lock on all configuration registers of the TIO device 216. As described above, the TIO device 216 verifies that the global lock command originated with the PA 204. After setting the global lock on the configuration registers, the TIO device 216 will reject any changes to those registers that do not originate from the PA 204.

In block 808, the PA 204 commands the TIO device 216 to return configuration data to the PA 204. The configuration data may be embodied as or otherwise include binary data indicative of a configuration space of the TIO device 216 or other machine-readable data indicative of the configuration of the TIO device 216. In block 810, the PA 204 validates the device configuration data. The PA 204 determines whether the TIO device 216 is ready to perform secure TIO, for example by evaluating one or more configuration register settings. For example, the PA 204 may determine whether an endpoint device is ready to perform trusted I/O. As another example, the PA 204 may determine whether a PCIe switch is configured correctly to enforce Access Control Services (ACS), which may prevent Requester ID spoofing or prevent undesirable peer-to-peer transactions between devices.

In block 812, the PA 204 determines whether the device configuration data was successfully validated. If not, the method 800 branches to block 826, in which the PA 204 may command the TIO device 216 out of TIO mode, as described below. If the device configuration data was successfully validated by the PA 204, the method 800 advances to block 814.

In block 814, the PA 204 commands the TIO device 216 to atomically release the global lock on the configuration registers and to set a fine-grained lock on one or more sensitive configuration registers. The fine-grained lock may be set on any registers that may impact trusted I/O if misconfigured. For example, the fine-grained lock may be set on one or more PCI base address registers (BARs) of the TIO device 216. As another example, the fine-grained lock may prevent privileged software from changing ACS settings for PCIe switches. As described above, the TIO device 216 verifies that the atomic unlock/lock command originated with the PA 204. Because the global lock is released and the fine-grained lock is set in one atomic operation, the device configuration of the TIO device 216 may not be changed before setting the fine-grained lock. After setting the fine-grained lock, the TIO device 216 will reject any changes to the locked registers that do not originate from the PA 204. Other configuration registers may be changed during trusted I/O by other entities, such as the TEE 208.

In block 816, the PA 204 returns the device configuration data to the TEE 208. The device configuration data may be returned to the TEE 208 via the host device driver 206 and the paravirtualized guest device driver 212. As described further below, the TEE 208 may also validate the device configuration data. After validating the device configuration data, the TEE 208 may perform trusted I/O with the TIO device 216. As described above in connection with FIG. 4, the TIO device 216 may allow the TEE 208 to access certain unlocked configuration registers, and may prevent the TEE 208 from accessing locked configuration registers.

In block 818, the PA 204 determines whether a request to release the TIO device 216 has been received from the VMM 214. As described above, the VMM 214 manages hardware resources of the computing device 100 and may send a request to the PA 204 to release one or more TIO devices 216. If a request to release the TIO device 216 is not received, the method 800 branches ahead to block 822, described below. If a request to release the TIO device 216 is received, the method 800 advances to block 820, in which the PA 204 sends a request to the TEE 208 to release the TIO device 216.

In block 822, the PA 204 determines whether the TEE 208 has released the TIO device 216. The TEE 208 may release the TIO device 216 in response to closing a resource, terminating a process, exiting the TEE 208, or otherwise stopping use of the TIO device 216. The TEE 208 may release the TIO device 216 in response to a request from the PA 204 or independently of any request (e.g., in response to completing TIO processing). If the TEE 208 has not released the TIO device 216, the method 800 loops back to block 818 to continue monitoring for release of the TIO device 216. If the TEE 208 has released the TIO device 216, the method 800 advances to block 824.

In block 824, the PA 204 commands the TIO device 216 to release the fine-grained lock on the configuration registers. As described above, the TIO device 216 verifies that the register unlock command originated with the PA 204. In block 826, the PA 204 determines whether any other TEE 208 is using the TIO device 216. For example, the PA 204 may maintain a list or other data structure of TEEs 208 that have been set up for TIO with the TIO device 216. If any other TEE 208 is still using the TIO device 216, the method 800 loops back to block 802 to process additional requests to prepare the TIO device 216 for trusted I/O. If no other TEE 208 is using the TIO device 216, the method 800 advances to block 828, in which the PA 204 commands the TIO device 216 out of trusted I/O mode. As described above, the TIO device 216 verifies that the command to exit TIO mode originated with the PA 204. After exiting TIO mode, the TIO device 216 may be configured or otherwise used by entities other than the PA 204, for example for ordinary, untrusted I/O. After taking the TIO device 216 out of TIO mode, the method 800 loops back to block 802 to process additional requests to prepare the TIO device 216 for trusted I/O.

Referring now to FIG. 9, in use, the computing device 100 may execute a method 900 for secure device configuration. It should be appreciated that, in some embodiments, the operations of the method 900 may be performed by one or more components of the environment 200 of the computing device 100 as shown in FIG. 2, such as the TEE 208. The method 900 begins with block 902, in which the computing device 100 launches a trusted execution environment (TEE) 208. For example, the TEE 208 may be launched by the VMM 214 as described above in connection with FIGS. 3 and 5. The TEE 208 may be embodied as a trust domain (TD) protected with the MKTME 126, a virtual machine, or other trusted execution environment protected using hardware support of the computing device 100. The TEE 208 may be protected from unauthorized disclosure and/or tampering by the VMM 214, the host partition 202, and/or other TEEs 208.

In block 904, the TEE 208 requests attestation of a TIO device 216 from the provisioning agent (PA) 204. As described above, the TEE 208 may be assigned one or more TIO devices 216 by the VMM 214. Those TIO devices 216 may be exposed to the TEE 208 as one or more virtual devices that are accessible using one or more paravirtualized guest device drivers 212. As described above, the TEE 208 may submit the request for attestation via the paravirtualized guest device driver 212, which submits the request to a host device driver 206. The host device driver 206 forwards the request to the PA 204 for servicing.

In response to the request, in block 906, the TEE 208 receives an attestation report from the PA 204. As described above, the attestation report may be received from the PA 204 via the host device driver 206 and the guest device driver 212. As also described above, the attestation report includes device attestation report information associated with the TIO device 216 as well as PA attestation report information associated with the PA 204. The attestation report may be signed with the private key of the PA 204 and may include a public key and/or certificate of the PA 204.

In block 908, the TEE 208 verifies the attestation report. The TEE 208 may use any appropriate technique to verify the integrity and the contents of the attestation report. In block 910, the TEE 208 verifies the PA attestation report information included in the attestation report. In some embodiments, the PA attestation report may be verified using hardware support of the computing device 100, for example, by executing one or more processor instructions to perform an SGX local or remote attestation protocol. In block 912, the TEE 208 verifies the device attestation report information included in the attestation report. The TEE 208 may verify the integrity the device attestation report using the public key of the PA 204. The TEE 208 may also verify the information included in the device attestation report (e.g., the type, manufacturer, firmware version, or other attributes of the TIO device 216).

In block 914, the TEE 208 determines whether the attestation report was successfully verified. If not, the method 900 branches to block 924, in which the TEE 208 raises a verification error. The TEE 208 does not perform any trusted I/O with the TIO device 216, which may protect against a malicious TIO device 216. Referring back to block 914, if the attestation report is successfully verified, the method 900 advances to block 916.

In block 916, the TEE 208 requests that the PA 204 prepares the TIO device 216 for trusted I/O. In block 918, the TEE 208 receives device configuration information from the PA 204. As described above, the device configuration information may be embodied as or otherwise include binary data indicative of a configuration space of the TIO device 216 or other data indicative of the configuration of the TIO device 216.

In block 920, the TEE 208 verifies the device configuration information and associated host configuration data. For example, the device configuration information may include one or more PCI base address registers (BARs) associated with the TIO device 216. The TEE 208 may verify that MMIO registers mapped by the VMM 214 into the guest address space of the TEE 208 match the device configuration information.

In block 922, the TEE 208 checks whether the device configuration information and associated host configuration data was successfully verified. If not, the method 900 branches to block 924, in which the TEE 208 raises a verification error. Referring back to block 922, if the device configuration information and associated host configuration data is successfully verified, the method 900 advances to block 926.

In block 926, the TEE 208 performs trusted I/O operations with the TIO device 216. The TEE 208 (e.g., the guest device driver 212) may program one or more direct memory access (DMA) registers of the TIO device 216 and cause the TIO device 216 to perform TIO operations. Data transferred by the TIO operations may be protected from software and/or hardware attacks. For example, the TEE 208 and the TIO device 216 may encrypt or otherwise protected transferred I/O data with one or more link keys or other encryption keys.

In block 928, the TEE 208 determines whether trusted I/O with the TIO device 216 is complete. TIO operations may be completed, for example, in response to the TEE 208 receiving a request from the PA 204 to release the TIO device 216. As another example, the TIO operations may be completed based on actions or parameters of a guest application 210, in response to user input, or otherwise be completed independently of the PA 204. If the TIO operations are not completed, the method 900 loops back to block 926 to continue performing TIO with the TIO device 216. If the TIO operations are done, the method 900 advances to block 930.

In block 930, the TEE 208 releases the TIO device 216 to the PA 204. As described above in connection with FIG. 8, the PA 204 may command the TIO device 216 to unlock the device configuration and, if no other TEEs 208 are using the TIO device 216, may cause the TIO device 216 to leave the TIO mode. After releasing the TIO device 216, the method 900 loops back to block 904, in which the TEE 208 may validate and perform TIO with additional TIO devices 216.

Figure 10:
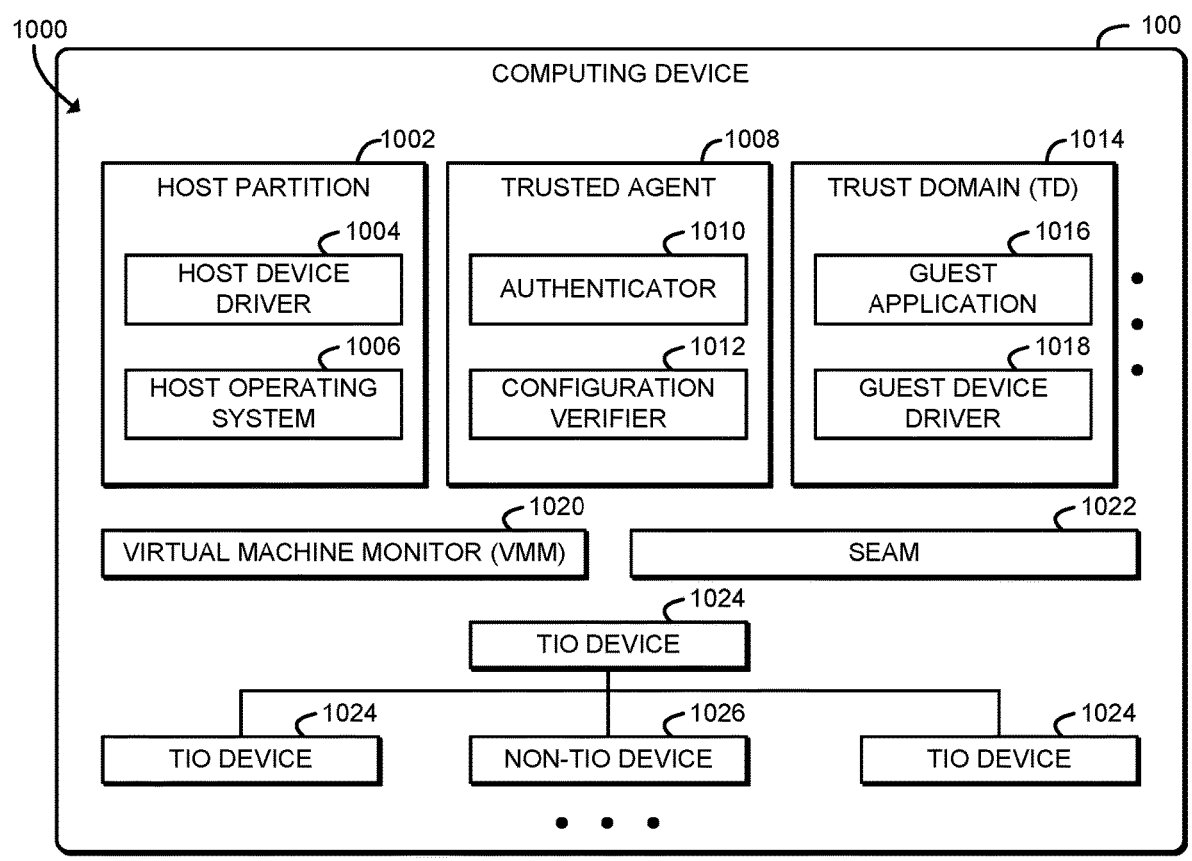
FIG. 10 is a simplified block diagram of at least one embodiment of another environment of the computing device of FIG. 1.

Referring now to FIG. 10, in an illustrative embodiment, the computing device 100 establishes an environment 1000 during operation. The illustrative environment 1000 includes a host partition 1002, a trusted agent 1008, multiple trust domains (TDs) 1014, a virtual machine monitor (VMM) 1020, a secure arbitration mode (SEAM) 1022, and trusted I/O (TIO) devices 1024. The various components of the environment 1000 may be embodied as hardware, firmware, software, or a combination thereof. As such, in some embodiments, one or more of the components of the environment 1000 may be embodied as circuitry or collection of electrical devices (e.g., host partition circuitry 1002, trusted agent circuitry 1008, TEE circuitry 1014, VMM circuitry 1020, SEAM circuitry 1022, and/or TIO device circuitry 1024). It should be appreciated that, in such embodiments, one or more of the host partition circuitry 1002, the trusted agent circuitry 1008, the TEE circuitry 1014, the VMM circuitry 1020, the SEAM circuitry 1022, and/or the TIO device circuitry 1024 may form a portion of the processor 120, the I/O subsystem 124, the accelerator 134, the peripheral devices 136, and/or other components of the computing device 100. Additionally, in some embodiments, one or more of the illustrative components may form a portion of another component and/or one or more of the illustrative components may be independent of one another.

The VMM 1020 may be embodied as any virtual machine monitor, hypervisor, or other component that manages execution of one or more virtualized workloads on the computing device 100. The VMM 1020 may manage workloads using hardware support of the processor 120, for example by executing in a privileged state such as VMX root, ring level−1, or another virtualization root mode. As described further below, the VMM 1020 is responsible for managing hardware resources of the computing device 100, including the TIO devices 1024. The VMM 1020 may be configured to launch the host partition 1002, the trusted agent 1008, and/or the TDs 1014.

The SEAM 1022 is a trusted firmware component of the computing device 100. The SEAM 1022 executes in a privileged state similar to VMX root, ring level−1, or another virtualization root mode. Thus, the SEAM 1022 is a peer entity to the VMM 1022. The SEAM 1022 establishes defined interfaces to trust domains (e.g., TDs 1014) and the VMM 1020. The SEAM 1022 may be embodied as a firmware library that is loaded by a SEAM loader and measured by hardware of the computing device 100 (e.g., by the processor 120). The measurement of the SEAM 1022 may be provided to any requesting trust domain 1014 or other TEE, which may use the measurement to verify the authenticity of the SEAM 1022. The SEAM 1022 provides trusted services to trust domains 1014. For example, the SEAM 1022 may configure page tables for each trust domain 1014, which may allow the VMM 1022 to be removed from the trusted computing base (TCB) of each trust domain 1014.

The host partition 1002 may be embodied as a root partition, service virtual machine, or other partition of the computing device 100 that is trusted by the VMM 1020 to access hardware of the computing device 100 (e.g., the TIO devices 1024). As shown, the host partition 1002 includes a host operating system 1006 and one or more host device drivers 1004. As described further below, the host operating system 1006 and/or the host device drivers 1004 may directly control or otherwise interact with the TIO devices 1024 and/or non-TIO devices 1026. The host operating system 1006 is configured to determine wherein an I/O device is capable of trusted I/O (e.g., is a TIO device 1024) and, if so, send a request to authenticate the TIO device 1024 to the trusted agent 1008. The host operating system 1006 may be further configured to program the configuration of the TIO device 1024. The host operating system 1008 is further configured to command the TIO device 1024 to lock configuration of the TIO device 1024, receive a device configuration report from the TIO device 1024, and provide the device configuration report to the trusted agent 1008. The device configuration report may be indicative of configuration registers of the TIO device 1024. In some embodiments, those functions may be performed by one or more other components, such as the host device drivers 1004 and/or the VMM 1020.

The trusted agent 1008 may be embodied as a trust domain or other trusted execution environment of the computing device 100. The trusted agent 1008 may execute in a guest mode (e.g., VMX non-root) or other non-root virtualization mode. Illustratively, the trusted agent 1008 executes as or is included in a trust domain that is protected with the MKTME 126. The trusted agent 1008 may be embodied as an architecturally defined trust domain that may be recognized by other entities of the computing device 100, including the VMM 1022 and/or the SEAM 1024. The trusted agent 1008 is configured to provide a trusted agent attestation report to the SEAM 1024 and to perform an authenticated key exchange protocol with a TD 1014 in response to providing the trusted agent attestation report. The trusted agent 1008 is further configured to receive the request to authenticate the TIO device 1024 from the host operating system 1006, authenticate the TIO device 1024, and perform an authenticated key exchange protocol with the TIO device 1024 in response to authenticating the TIO device 1024. Performing the authenticated key exchange protocol may include provisioning a shared secret key to the TIO device 1024. The trusted agent 1006 is further configured to provision a link encryption key to the TIO device 1024 in response performing the authenticated key exchange protocol with the TIO device 1024. The trusted agent 1008 is further configured to receive the device configuration report from the host operating system 1006 and verify the device configuration report. The trusted agent 1008 is further configured to determine whether the TIO device 1024 is already assigned to a TD 1014 and, if not, record a binding between the TIO device 1024 and the TD 1014. The trusted agent 1008 is further configured to send the device configuration report to the TD 1014 in response to verifying the device configuration report and recording the binding. The trusted agent 1008 is further configured to remove the binding between the TIO device 1024 and the TD 1014 in response to the TIO device 1024 being released by the TD 1014 or receiving a request to reclaim the TIO device 1024 from the host operating system 1006. In some embodiments, those functions may be performed by one or more subcomponents, such as an authenticator 1010 and/or a configuration verifier 1012.

Each TIO device 1024 may be embodied as an I/O device capable of secure configuration and trusted I/O operations as described further below. For example, the TIO devices 1024 may include one or more data storage devices 130, network interface controllers 132, accelerators 134, peripheral devices 136, or other endpoint devices and/or one or more I/O switches 138 or other switches that connect endpoint devices to a root complex of the host. Each TIO device 1024 may be configured to perform trusted I/O with a TD 1014. Performing trusted I/O may include securely transferring I/O data using a link encryption key (e.g., encrypting or decrypting the I/O data using the link encryption key).

As shown in FIG. 10, the TIO devices 1024 may be included in a device tree such as a PCI Express (PCIe) device tree. The device tree may also include one or more non-TIO devices 1026. Each non-TIO device 1026 may be embodied as an I/O device (e.g., a data storage device 130, network interface controller 132, accelerator 134, peripheral device 136, and/or other endpoint, switch, or bridge device) that is not capable of secure configuration and trusted I/O operations.

Each of the TDs 1014 may be embodied as a trust domain, virtual machine, virtual network function (VNF), guest operating system, or other trusted environment of the computing device 100. Each TD 1014 is isolated or otherwise protected from the VMM 1020, host partition 1002, and other TDs 1014 with hardware support of the computing device 100. Thus, the VMM 1020 is outside of the trusted computing base (TCB) of each TD 1014. Illustratively, each TD 1014 is a trust domain (TD) that is protected with the MKTME 126. As shown, each TD 1014 may include a guest application 1016 and one or more guest device drivers 1018. The guest device drivers 1018 may access a paravirtualized application programming interface (API) or other interface supplied by a host device driver 1004, the host operating system 1006, and/or the VMM 1020. Each TD 1014 is configured to receive the trusted agent attestation report from the SEAM 1022 and verify the trusted agent attestation report. Each TD 1014 may be further configured to verify the device configuration report received from the trusted agent 1014 and to perform trusted I/O with the TIO device 1024 in response to verifying the device configuration report. Verifying the device configuration report may include verifying a device feature of the TIO device 1024, verifying a register address indicated by the device configuration report, and/or verifying a link encryption status indicated by the device configuration report.

Figure 11:
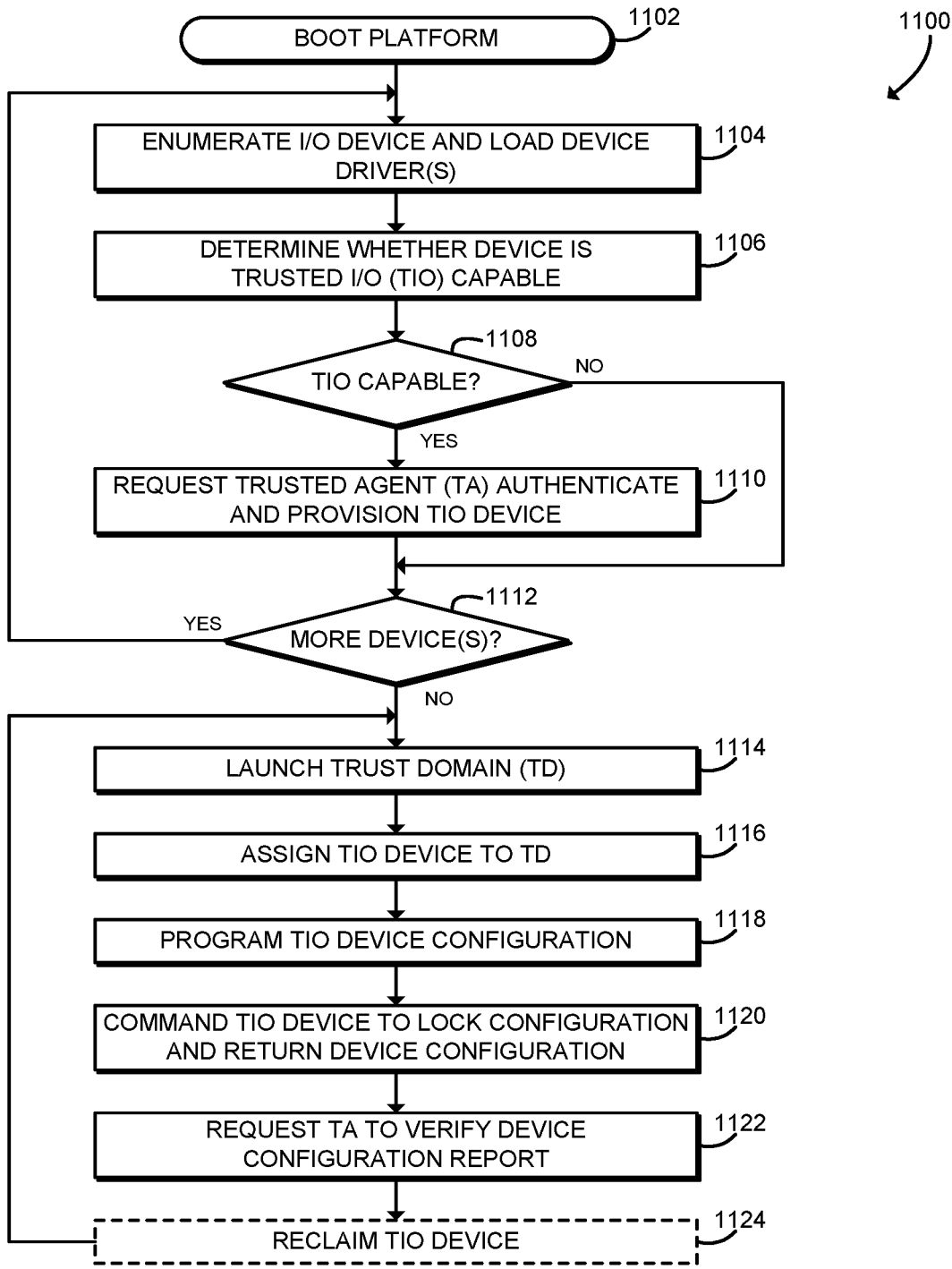
FIG. 11 is a simplified flow diagram of at least one embodiment of a method for secure device management that may be executed by the computing device of FIGS. 1 and 10.

Referring now to FIG. 11, in use, the computing device 100 may execute a method 1100 for secure device management. It should be appreciated that, in some embodiments, the operations of the method 1100 may be performed by one or more components of the environment 1000 of the computing device 100 as shown in FIG. 10, such as the VMM 1020. The method 1100 begins with block 1102, in which the computing device 100 boots. The computing device 100 may boot in response to a platform power on, reboot, or other power cycle event. In response to the boot event, the computing device 100 loads the VMM 1020, the SEAM 1022, the host partition 1002, the trusted agent 1008, and/or other privileged or architectural components of the computing device 100.

In block 1104, the computing device 100 enumerates an I/O device and loads any associated device drivers. For example, the VMM 1020 and/or host operating system 1006 may perform physical device discovery and enumeration (e.g., PCIe enumeration) at boot time to enumerate I/O devices and load corresponding host device drivers 1004. The computing device 100 may also enumerate I/O devices as they are attached, hot-plugged, or otherwise added to the computing device 100. The I/O devices may include one or more data storage devices 130, network interface controllers 132, accelerators 134, peripheral devices 136, or other endpoint devices and/or may include one or more I/O switches 138 or other switches that connect endpoint devices to a root complex of the host.

In block 1106, the computing device 100 determines whether the I/O device is capable of trusted I/O (TIO). The computing device 100 may use any technique to determine whether the device is TIO-capable (i.e., if the I/O device is a TIO device 1024 and not a non-TIO device 1026). For example, the VMM 1020, the host operating system 1006, and/or the host device driver 1004 may read one or more predetermined registers from a configuration space of the I/O device that indicate whether the I/O device is TIO-capable. The register may indicate that the TIO-capable device 1024 provides a secure device configuration interface to host software, including that the TIO device 1024 is capable of authentication and secure communication with the trusted agent 1008, is capable of locking configuration of one or more partitions of the TIO device 1024, and is capable of securely and accurately reporting its configuration and state to the trusted agent 1008. In block 1108 the PA 204 checks whether the current I/O device is TIO-capable. If not (e.g., if the current I/O device is a non-TIO device 1026), the method 100 branches ahead to block 1112, described below. If the current I/O device is TIO-capable, the method 1100 advances to block 1110.

In block 1110, the computing device 100 requests that the trusted agent 1008 authenticate and provision the current TIO device 1024. For example, the VMM 1020, the host operating system 1006, and/or the host device driver 1004 may send a request to the trusted agent 1008 that identifies the current TIO device 1024. The request may include a device certificate or other identification data that may be used by the trusted agent 1008 to authenticate and provision the TIO device 1024. One potential embodiment of a method for authenticating and provisioning the TIO device 1024 is described below in connection with FIG. 12.

In block 1112, the computing device 100 determines whether additional I/O devices remain for authentication and provisioning. If so, the method 1100 loops back to block 1104 to continue enumerating I/O devices. After all I/O devices have been enumerated, the method 1100 advances to block 1114.

In block 1114, the computing device 100 launches a trust domain (TD) 1014. As described above, each TD 1014 is a trusted execution environment (TEE) that is protected with the MKTME 126 support. Accordingly, the contents in memory of the TD 1014 are protected in hardware from the VMM 1020 and from other TDs 2014.

In block 1116, the computing device 100 assigns a TIO device 1024 to the TD 1014. The TIO device 1024 may be assigned, for example, in response to the TD 1014 requesting access to the TIO device 1024. The computing device 100 may use any technique to assign the TIO device 1024 to the TD 1014. In some embodiments, the VMM 1020 and/or the host operating system 1006 may configure the TD 1014 to allow the TD 1014 to access a configuration space, MMIO registers, or other memory addresses that can control the TIO device 1024. The TIO device 1024 may be securely bound to the TD 1014 using the SEAM 1022 and/or the VMM 1020.

In block 1118, the computing device 100 programs the device configuration of the TIO device 1024. The VMM 1020, the host operating system 1006, and/or the host driver 1004 may set registers, read and/or write memory addresses, or otherwise configure the TIO device 1024.

In block 1120, the computing device 100 commands the TIO device 1024 (or a partition of the TIO device 1024 such as a virtual function) to lock its configuration and return a device configuration report. The command to lock configuration may be sent by the VMM 1020, the host operating system 1006, and/or a host driver 1004. After being locked, the TIO device 1024 only allows trusted controlling entities (e.g., the TD 1014) to read or modify certain registers that control device behavior. The command to lock the TIO device 1024 may include a nonce used for replay detection as described further below. The device configuration report returned from the TIO device 1024 includes data that represents the identity and/or current configuration of the TIO device 1024. For example, the device configuration report may be embodied as or otherwise include binary data indicative of a configuration space of the TIO device 1024 or other machine-readable data indicative of the configuration of the TIO device 1024.

In block 1122, the computing device 100 requests the trusted agent 1008 to verify the device configuration report. The request may be sent by the VMM 1020, the host operating system 1006, and/or a host driver 1004. The trusted agent 1008 may verify the device configuration report, for example, by verifying the integrity and authenticity of the report, verifying that the TIO device 1024 has not been previously assigned to another TD 1014, and/or performing other verification operations. If the device configuration report is verified by the trusted agent 1008, the device configuration report may be accepted by the TD 1014, and then the TD 1014 may use the TIO device 1024 for trusted I/O. Potential embodiments of methods for verifying and accepting the device configuration report are described below in connection with FIGS. 13-14.

In block 1124, in some embodiments, the computing device 100 may reclaim the TIO device 1024. The TIO device 1024 may be reclaimed by the VMM 1020, the host operating system 1006, and/or the host driver 1004. The TIO device 1024 may be reclaimed if the TD 1014 closes or otherwise releases the TIO device 1024 or may be reclaimed preemptively (e.g., if the TD 1014 is terminated or crashes, if the TIO device 1024 resets or is disconnected, in response to hotplug events, or in other circumstances). The method 1100 loops back to block 1114 to continue launching TDs 1014 and assigning TIO devices 1024.

Figure 12:
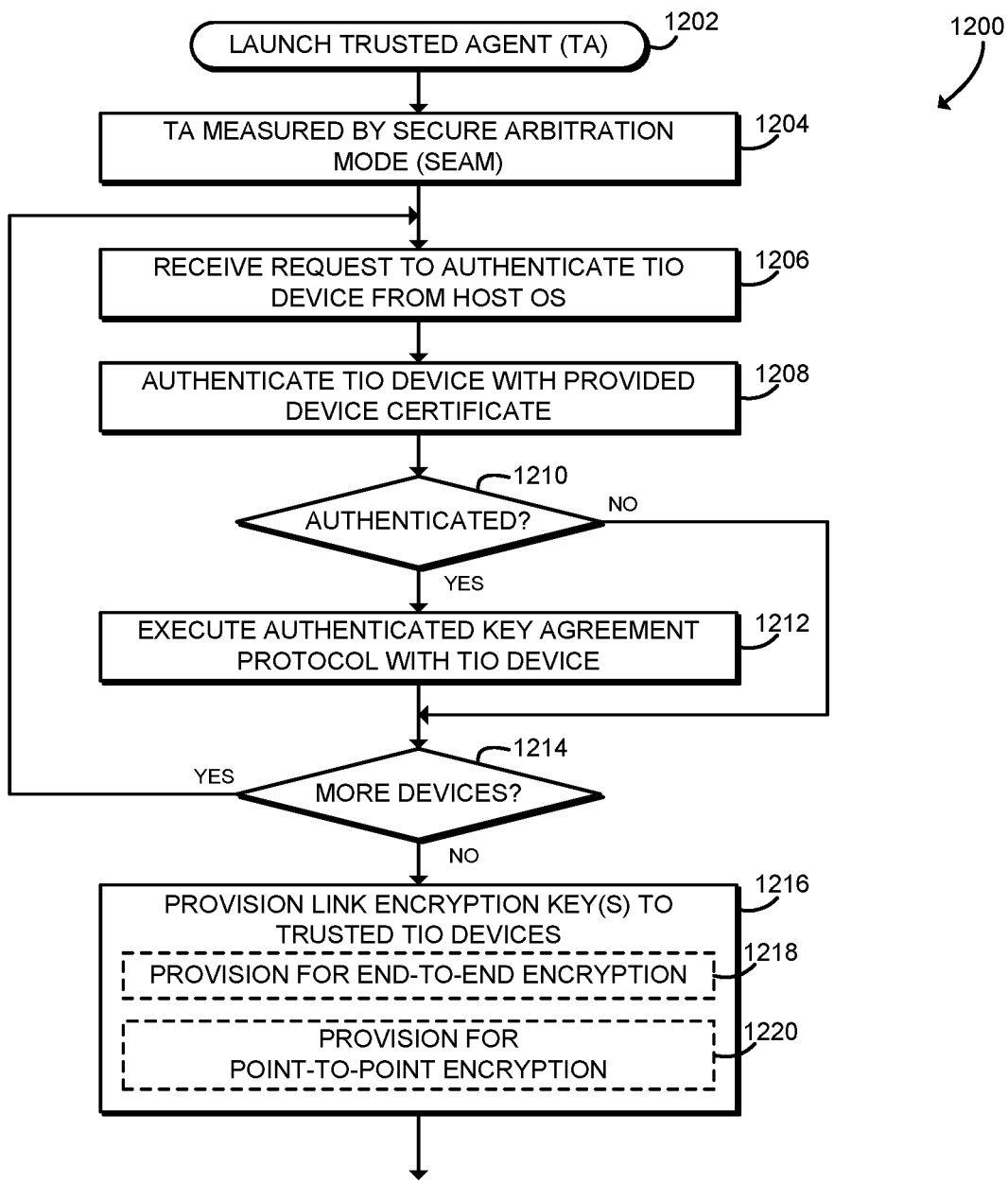
FIG. 12 is a simplified flow diagram of at least one embodiment of a method for secure device authentication and provisioning that may be executed by the computing device of FIGS. 1 and 10.

Referring now to FIG. 12, in use, the computing device 100 may execute a method 1200 for secure device authentication and provisioning. It should be appreciated that, in some embodiments, the operations of the method 1200 may be performed by one or more components of the environment 1000 of the computing device 100 as shown in FIG. 10, such as the trusted agent 1008. The method 1200 begins with block 1202, in which the computing device 100 launches the trusted agent 1008. As described above, the trusted agent 1008 is an architectural trust domain that may be launched by the VMM 1020.

In block 1204, the SEAM 1022 measures the trusted agent 1008 as the trusted agent 1008 is launched. The SEAM 1022 stores the measurement for later use. The measurement may be indicative of the contents and identity of the trusted agent 1008. As described further below, the SEAM 1022 may provide an attestation report or other data including the measurement to the TDs 1014, and the TDs 1014 may use the attestation report to authenticate the trusted agent 1008.

In block 1206, the trusted agent 1008 receives a request to authenticate a TIO device 1024 from the host operating system 1006. The request may be sent during device enumeration during initial boot and/or in response to a device being added to the computing device (e.g., a hotplug event). As described above, the request may include a device certificate associated with the TIO device 1024.

In block 1208, the trusted agent 1008 authenticates the TIO device 1024 using the provided device certificate. The trusted agent 1008 and the TIO device 1024 may perform any appropriate device authentication protocol, such as a protocol as described by a PCI Express device authentication specification. For example, the trusted agent 1008 and the TIO device 1024 may perform a challenge-response protocol in which the trusted agent 1008 sends a random nonce to the TIO device 1024, the TIO device 1024 signs the nonce with a private key and returns the result, and the trusted agent 1008 verifies the response using the certificate (and corresponding public key). In block 1210, the trusted agent 1008 determines whether the TIO device 1024 was successfully authenticated. If not, the method 1200 branches to block 1214, described below. If the TIO device 1024 was successfully authenticated, the method 1200 advances to block 1212.

In block 1212, the trusted agent 1008 executes an authenticated key agreement protocol with the TIO device 1024. For example, the trusted agent 1008 and the TIO device 1024 may perform an authenticated Diffie-Hellman key exchange. After performing the key exchange, both the TIO device 1024 and the trusted agent 1008 possess a shared secret key (e.g., a session key or other symmetric encryption key).

In block 1214, the trusted agent 1008 determines whether additional TIO devices 1024 remain to be authenticated. If so, the method 1200 loops back to block 1206 to continue authenticating TIO devices 1024. If no additional TIO devices 1024 remain to be authenticated, the method 1200 advances to block 1216.

In block 1216, the trusted agent 1008 provisions one or more link encryption keys to the trusted TIO devices 1024. The trusted agent 1008 may provision the link encryption keys securely, for example, by wrapping each link encryption key with the secret key shared with the TIO device 1024. The TIO device 1024 may use the link encryption key to protect I/O data transferred between the TIO device 1024 and the host over one or more I/O links (e.g., PCIe links). In some embodiments, in block 1218 the trusted agent 1008 may provision the TIO devices 1024 for end-to-end encryption. In such embodiments, the trusted agent 1008 may provision matching link encryption keys to an endpoint TIO device 1024 and the root port of the computing device 100. In those embodiments, the I/O data is encrypted and/or decrypted at each end of the I/O link (i.e., the root port and the TIO device 1024). The encrypted I/O data may be forwarded by intermediate I/O devices between the root port and the TIO device 1024 without encryption or decryption. Thus, end-to-end encryption may be used securely even in the presence of untrusted or non-TIO-capable I/O switches 138 or other intermediate I/O devices.

In some embodiments, in block 1220 the trusted agent 1008 may provision the TIO devices 1024 for point-to-point encryption. In such embodiments, matching link encryption keys are provisioned to the end nodes of each intermediate I/O link between the root port and the TIO device 1024. In those embodiments, each intermediate I/O device (e.g., I/O switches 138 or other devices) must be TIO-capable and provisioned with link encryption keys accordingly. Accordingly, the trusted agent 1008 may assemble a graph or other representation of the topology of the I/O devices in order to determine whether any devices in the I/O path are untrusted or not capable of link encryption. The trusted agent 1008 may not enable link encryption for a TIO device 1024 that is connected to the root port via one or more untrusted or non-TIO-capable intermediate devices. After provisioning the link encryption keys, the method 1200 is completed. The trusted agent 1008 may continue to verify TIO device 1024 configuration as described below in connection with FIG. 13.

Figure 13:
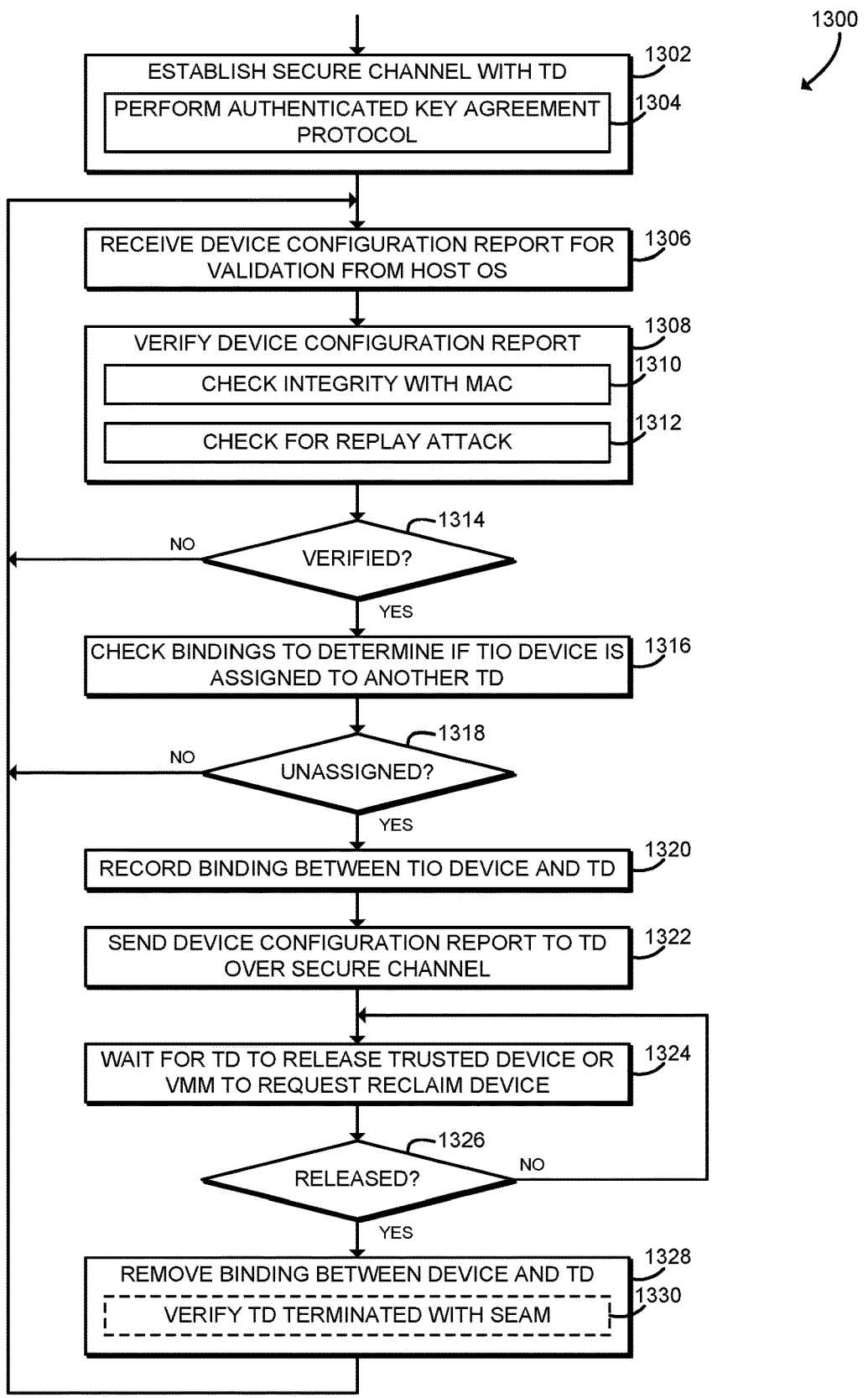
FIG. 13 is a simplified flow diagram of at least one embodiment of a method for secure device configuration that may be executed by the computing device of FIGS. 1 and 10.

Referring now to FIG. 13, in use, the computing device 100 may execute a method 1300 for secure device configuration. It should be appreciated that, in some embodiments, the operations of the method 1300 may be performed by one or more components of the environment 1000 of the computing device 100 as shown in FIG. 10, such as the trusted agent 1008. The method 1300 begins with block 1302, in which the trusted agent 1008 establishes a secure channel with a TD 1014. As part of establishing the secure channel, the TD 1014 may authenticate the trusted agent 1008 as described further below in connection with FIG. 14. In block 1304, the trusted agent 1008 and the TD 1014 perform an authenticated key agreement protocol, such as an authenticated Diffie-Hellman key exchange. After performing the exchange, both the trusted agent 1008 and the TD 1014 possess a shared secret key. The shared key may be used to protect a secure communication channel between the trusted agent 1008 and the TD 1014. The trusted agent 1008 may similarly establish secure channels with each TD 1014 executed by the computing device 100.

In block 1306, the trusted agent 1008 receives a device configuration report from the host operating system 1006. As described above, the device configuration report includes data that represents the identity and/or current configuration of the TIO device 1024. For example, the device configuration report may be embodied as or include binary data indicative of a configuration space of the TIO device 1024, register values, or other machine-readable data indicative of the configuration of the TIO device 1024. The device configuration report may include any information indicative of the current configuration and/or identity of the TIO device 1024, such as device identity, link security status, assigned memory ranges, assigned interfaces, and/or other configuration information. The device configuration report may also include authentication data such as a nonce (received with the device lock and report command) and a message authentication code (MAC) or other integrity tag computed over the device configuration report using the session key shared by the trusted agent 1008 and the TIO device 1024.

In block 1308, the trusted agent 1008 verifies the device configuration report. In block 1310, the trusted agent 1008 checks the integrity of the device configuration report using the MAC. In block 1312, the trusted agent 1008 checks against potential replay attacks by comparing the nonce included in the report with the nonce previously sent by the trusted agent 1008 to the TIO device 1024. In block 1314, the trusted agent 1008 checks whether the device configuration report was successfully verified. If not, the method 1300 loops back to block 1306, in which the trusted agent 1008 may verify additional TIO devices 1024. If the device configuration report is successfully verified, the method 1300 advances to block 1316.

In block 1316, the trusted agent 1008 checks a database of bindings to determine if the TIO device 1024 is currently assigned to a different TD 1014. For example, the trusted agent 1008 may maintain a Requester ID table or other data structure with bindings between TIO devices 1024 and TDs 1014. In block 1318, the trusted agent 1008 determines whether the TIO device 1024 is currently unassigned. If not (i.e., if the TIO device 1024 is already assigned to a TD 1014), the method 1300 loops back to block 1306, in which the trusted agent 1008 may verify additional TIO devices 1024. If the TIO device 1024 is unassigned, the method 1300 advances to block 1320.

In block 1320, the trusted agent 1008 records a binding between the TIO device 1024 and the TD 1014. The trusted agent 1008 may, for example, add or update an entry in the Requester ID table. In block 1322, the trusted agent 1008 sends the device configuration report over the secure channel to the TD 1014. In some embodiments, the trusted agent 1008 may send a modified device configuration report to the TD 1014. For example, the modified report may mask details that should not be exposed to a guest in a virtualized environment (e.g., host physical addresses of MMIO registers). The trusted agent 1008 may, for example, replace the host physical addresses of MMIO registers in the report with a cryptographic hash of the host physical addresses. As described further below in connection with FIG. 14, the TD 1014 may evaluate the device configuration report and determine whether to accept the TIO device 1024. If accepted, the TD 1014 performs trusted I/O with the TIO device 1024.

In block 1324, the trusted agent 1008 waits for the TD 1014 to release the TIO device 1024 or for the VMM 1022 to request the TIO device 1024 be reclaimed. The TD 1014 may close or otherwise release the TIO device 1024 when the TD 1014 exits or otherwise stops performing trusted I/O. The VMM 1022 may reclaim the TIO device 1024, for example, if the TD 1014 is terminated or crashes, if the TIO device 1024 resets or is removed, or in other circumstances. In block 1326, the trusted agent 1008 checks whether the TIO device 1024 has been released. If not, the method 1300 loops back to block 1324. If the TIO device 1024 has been released, the method 1300 advances to block 1328.

In block 1328, the trusted agent 1008 removes the binding between the TD 1014 and the TIO device 1024. The trusted agent 1008 may, for example, remove or modify an appropriate entry from the Requester ID table. As described above, removing the binding may allow the TIO device 1024 to be reassigned to a TD 1014 in the future. In some embodiments, the binding may be removed when the TD 1014 is still active, for example if the TIO device 1024 is removed from the computing device 100 (e.g., hot-unplugged) or if the TIO device 1024 is reset. In some embodiments, in block 1330, the trusted agent 1008 may verify with the SEAM 1022 that the TD 1014 has been terminated. Verifying that the TD 1014 has actually been terminated with a trusted component such as the SEAM 1022 may protect from a malicious VMM 1020 or other untrusted components. For example, a malicious VMM 1020 may attempt to reclaim a device 1024 that is still in use by an active TD 1014. If the SEAM 1022 indicates that the TD 1014 is still active, then the trusted agent 1008 does not remove the binding, which may prevent the TIO device 1024 from being reassigned (potentially maliciously) to another TD 1014. After removing the binding, the method 1300 loops back to block 1306, in which the trusted agent 1008 may verify additional TIO devices 1024.

Figure 14:
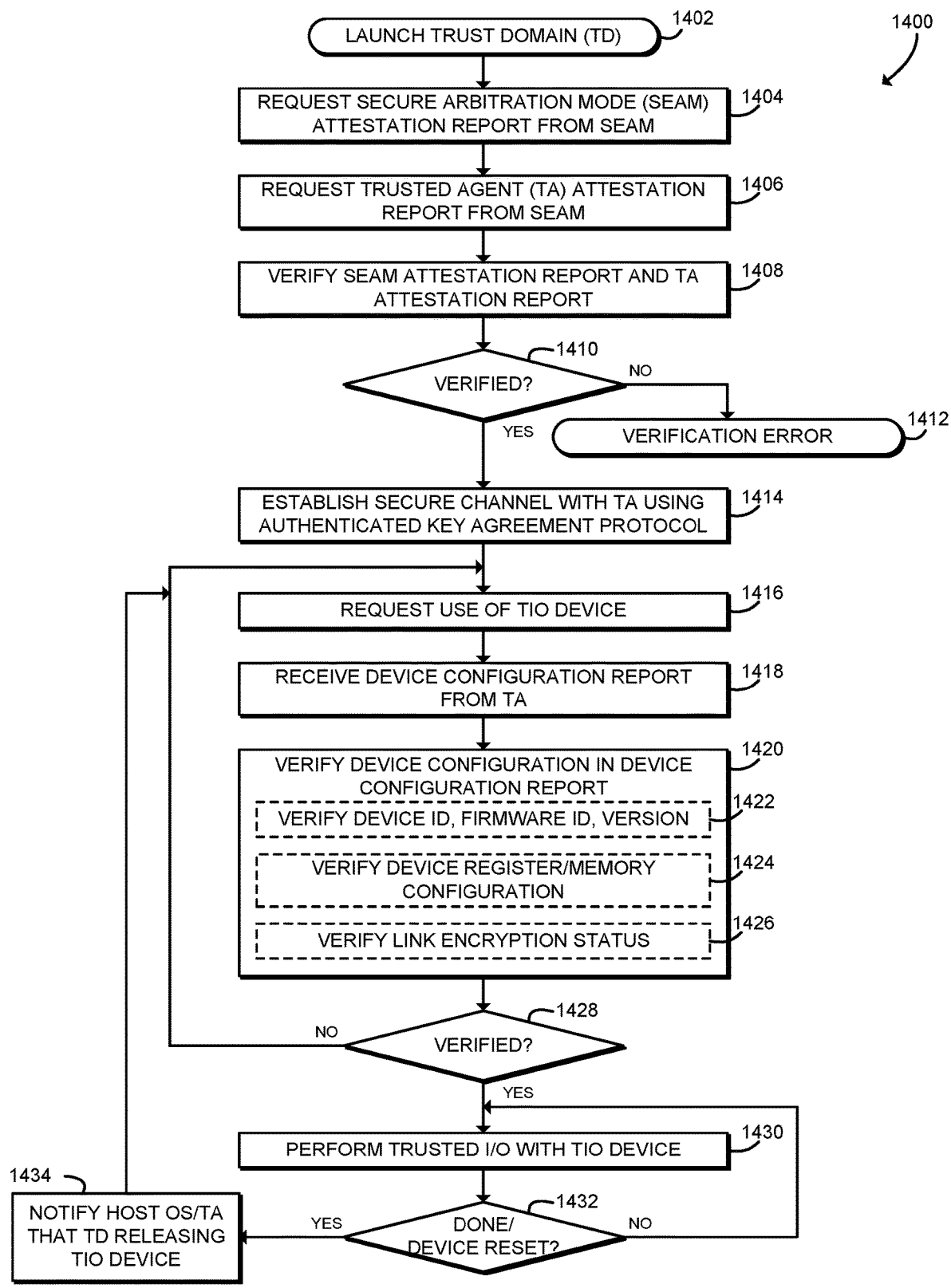
FIG. 14 is a simplified flow diagram of at least one embodiment of a method for secure device configuration that may be executed by the computing device of FIGS. 1 and 10.

Referring now to FIG. 14, in use, the computing device 100 may execute a method 1400 for secure device configuration. It should be appreciated that, in some embodiments, the operations of the method 1400 may be performed by one or more components of the environment 1000 of the computing device 100 as shown in FIG. 10, such as the TD 1014. The method 1400 begins with block 1402, in which the computing device 100 launches a trust domain (TD) 1014. For example, the TD 1014 may be launched by the VMM 1020 as described above in connection with FIG. 11. The TD 1014 may include a virtual machine, guest operating system, or other trusted execution environment protected using hardware support of the computing device 100. The TD 1014 may be protected from unauthorized disclosure and/or tampering by the VMM 1022, the host partition 1002, and/or other TDs 1014.

In block 1404, the TD 1014 requests a SEAM attestation report from the SEAM 1022. As described above, the SEAM attestation report includes a measurement of the SEAM 1022 generated by hardware of the computing device 100. In block 1406, the TD 1014 requests a trusted agent attestation report from the SEAM 1022. The trusted agent attestation report is indicative of the contents and identity of the trusted agent 1008, and as described above, the trusted agent 1008 supplies the attestation report to the SEAM 1022. In block 1408, the TD 1014 verifies the SEAM attestation report and the trusted agent attestation report. The TD 1014 may, for example, verify the authenticity and integrity of the reports. The TD 1014 may also verify one or more identities, versions, or other attributes included in the reports. In block 1410, the TD 1014 determines whether the SEAM attestation report and the trusted agent attestation report were both successfully verified. If not, the method 1400 branches to block 1412, in which the TD 1014 raises a verification error. If the SEAM attestation report and the trusted agent attestation report are both verified, then the SEAM 1022 and the trusted agent 1008 are trusted, and the method 1400 advances to block 1414.

In block 1414, the TD 1014 establishes a secure channel with the trusted agent 1008 using an authenticated key agreement protocol, such as an authenticated Diffie-Hellman key exchange. As described above, after performing the exchange, both the trusted agent 1008 and the TD 1014 possess a shared secret key. The shared key may be used to protect a secure communication channel between the trusted agent 1008 and the TD 1014.

In block 1416, the TD 1014 requests use of a TIO device 1024. The TD 1014 may submit the request, for example, to the host device driver 1004, the host operating system 1006, and/or the VMM 1020. The VMM 1020 assigns the TIO device 1024 to the TD 1014, configures the TIO device 1024, and locks the configuration of the TIO device 1024 as described above in connection with FIG. 11. The trusted agent 1008 verifies a device configuration report received from the TIO device 1024 as described above in connection with FIG. 13. In block 1418, the TD 1014 receives the device configuration report from the trusted agent 1008. The device configuration report may be received via the secure channel established between the TD 1014 and the trusted agent 1008.

In block 1420, the TD 1014 verifies the device configuration of the TIO device 1024 as indicated in the device configuration report. As described above, the trusted agent 1008 verifies the integrity of the device configuration report and prevents replay attacks. Thus, the TD 1014 may perform policy-based evaluations or other evaluations of the device configuration report to determine whether to proceed with trusted I/O using the TIO device 1024. In some embodiments, in block 1422, the TD 1014 may verify a device ID, firmware ID, and/or version (e.g., firmware version, device revision, etc.) indicated in the device configuration report. The TD 1014 may, for example, allow certain devices or certain firmware versions, deny certain devices or certain firmware versions, require updated firmware, or otherwise verify the device ID, firmware ID, and/or version. In some embodiments, in block 1424 the TD 1014 may verify device register or memory configuration indicated in the device configuration report. In some embodiments, in block 1426 the TD 1014 may verify link encryption status indicated in the device configuration report. For example, the TD 1014 may determine whether the link traffic is encrypted.

In block 1428, the TD 1014 determines whether the device configuration report was successfully verified. If not, the method 1400 loops back to block 1416 in which the TD 1014 may request use of another TIO device 1024. If the device configuration report was successfully verified, the method 1400 advances to block 1430.

In block 1430, the TD 1014 performs trusted I/O with the TIO device 1024. The TD 1014 may perform one or more MMIO transactions, DMA transactions, or other I/O operations with the TIO device 1024. The I/O data may be protected in transit from the TIO device 1024 to the root port of the computing device 100 using one or more link encryption keys as described above. The I/O data may be transferred between the root port and memory of the TD 1014 and thus may be protected from the VMM 1020, the host operating system 1006, and other TDs 1014. In block 1432, the TD 1014 determines whether the TD 1014 is done performing trusted I/O, whether the TIO device 1024 has reset or disconnected, or if the trusted I/O session is otherwise terminated. If not, the method 1400 loops back to block 1430 to continue performing trusted I/O. If the trusted I/O session is terminated, the method 1400 advances to block 1434.

In block 1434, the TD 1014 notifies the host operating system 1006 and the trusted agent 1008 that the TD 1014 is releasing the TIO device 1024. As described above, the trusted agent 1008 may also remove a binding between the TD 1014 and the TIO device 1024, allowing the TIO device 1024 to be reassigned. After notification, the method 1400 loops back to block 1416, in which the TD 1014 may request use of another TIO device 1024.

Figure 15:
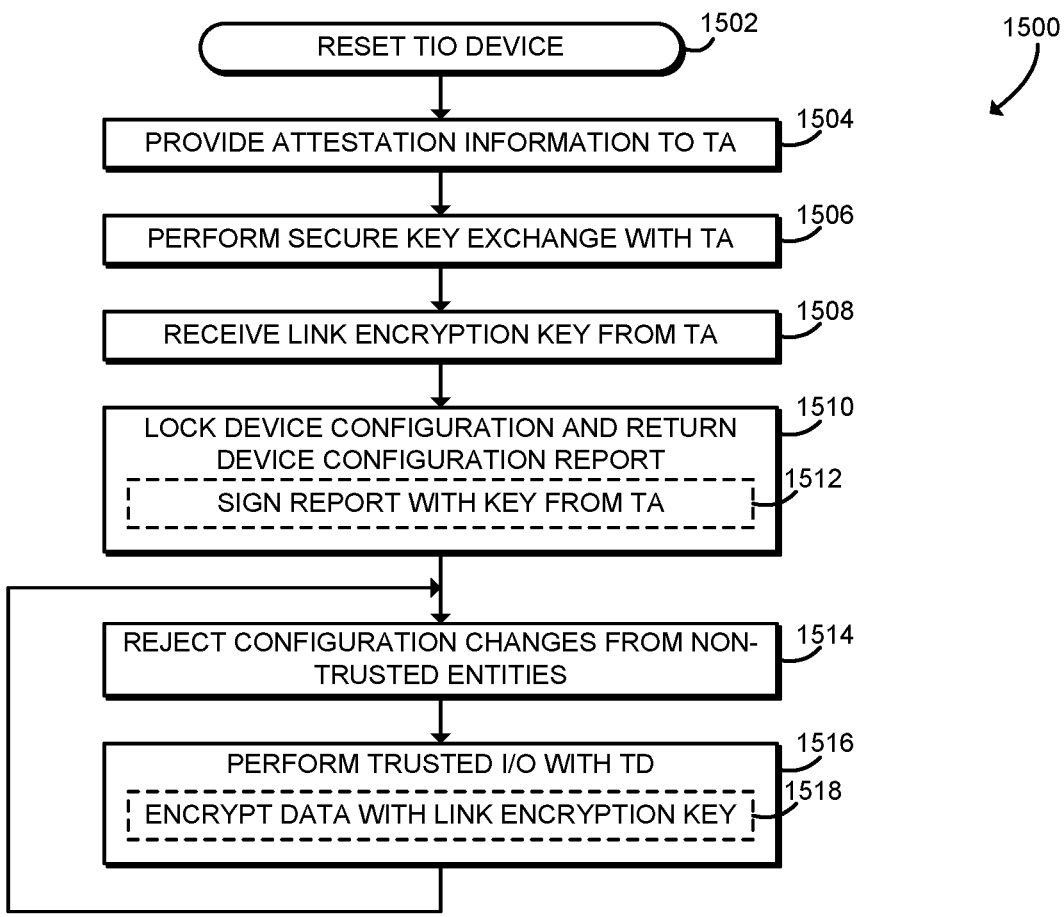
FIG. 15 is a simplified flow diagram of at least one embodiment of a method for trusted I/O that may be executed by an I/O device of the computing device of FIGS. 1 and 10.

Referring now to FIG. 15, in use, the computing device 100 may execute a method 1500 for trusted I/O. It should be appreciated that, in some embodiments, the operations of the method 1500 may be performed by one or more components of the environment 1000 of the computing device 100 as shown in FIG. 10, such as by a TIO device 1024. For example, the method 1500 may be executed by an I/O endpoint such as the accelerator 134 or a peripheral device 136, or by an I/O switch 138. The method 1500 begins with block 1502, in which the TIO device 1024 is reset. The TIO device 1024 may reset, for example, in response to a power cycle event, when connected or disconnected from the computing device 100, or at other times. During reset, the TIO device 1024 clears any stored session keys, link encryption keys, or other volatile state.

In block 1504, the TIO device 1024 provides attestation information to the trusted agent 1508. The attestation information be provided as part of a device authentication protocol. The trusted agent 1008 and the TIO device 1024 may perform any appropriate device authentication protocol, such as a protocol as described by a PCI Express device authentication specification. For example, the trusted agent 1008 and the TIO device 1024 may perform a challenge-response protocol in which the trusted agent 1008 sends a random nonce to the TIO device 1024, the TIO device 1024 signs the nonce with a private key and returns the result, and the trusted agent 1008 verifies the response using the certificate (and corresponding public key).

In block 1506, the TIO device 1024 performs a secure key exchange with the trusted agent 1008. The trusted agent 1008 and the TIO device 1024 may perform an authenticated key agreement protocol, such as an authenticated Diffie-Hellman key exchange. After performing the exchange, both the TIO device 1024 and the trusted agent 1008 possess a shared secret key (e.g., a session key or other symmetric encryption key).

In block 1508, the TIO device 1024 receives a link encryption key from the trusted agent 1008. The link encryption key may be wrapped with the session key exchanged with the trusted agent 1008 or otherwise securely provisioned to the TIO device 1024. As described above, the TIO device 1024 may use the link encryption key to protect I/O data communicated over an I/O link with the root port of the computing device 100 (or an intermediate device such as an I/O switch 138).

In block 1510, the TIO device 1024 locks device configuration for the TIO device 1024 (or a partition of the TIO device 1024) and returns a device configuration report. The TIO device 1024 may receive a command to lock the device configuration from the VMM 1020, the host operating system 1006, and/or a host driver 1004. After being locked, the TIO device 1024 only allows trusted controlling entities (e.g., the TD 1014) to read or modify certain registers that control device behavior. As described above, the device configuration report includes data that represents the identity and/or current configuration of the TIO device 1024. In some embodiments, in block 1512 the TIO device 1024 may sign the device configuration report with the session key exchanged with the trusted agent 1008 or other key provisioned by the trusted agent 1008. The TIO device 1024 may, for example, generate a message authentication code (MAC) over the device configuration report using the session key.

After locking the device configuration, in block 1514 the TIO device 1024 rejects configuration changes from non-trusted entities. For example, the TIO device 1024 may only permit trusted controlling entities (e.g., an assigned TD 1014) to read or modify certain registers that control device behavior. In block 1516, the TIO device 1024 performs trusted I/O with a TD 1014. As describe above, the TIO device 1024 may perform DMA and/or MMIO transactions with the TD 1014. In some embodiments, in block 1518 the TIO device 1024 may encrypt or decrypt I/O data using the link encryption key provisioned by the trusted agent 1008. After performing trusted I/O, the method 1500 loops back to block 1514 to continue performing trusted I/O with locked device configuration. The TIO device 1024 may be reset or the method 1500 may be otherwise restarted in response to the TD 1014 releasing the TIO device 1024, the VMM 1020 reclaiming the TIO device 1024, or otherwise.

It should be appreciated that, in some embodiments, the methods 300, 400, 500, 600, 700, 800, 900, 1100, 1200, 1300, 1400, and/or 1500 may be embodied as various instructions stored on a computer-readable media, which may be executed by the processor 120, the I/O subsystem 124, the accelerator 134, peripheral devices 136 and/or other components of the computing device 100 to cause the computing device 100 to perform the respective method 300, 400, 500, 600, 700, 800, 900, 1100, 1200, 1300, 1400, and/or 1500. The computer-readable media may be embodied as any type of media capable of being read by the computing device 100 including, but not limited to, the memory 128, the data storage device 130, firmware devices, other memory or data storage devices of the computing device 100, portable media readable by a peripheral device 136 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure device configuration, the computing device comprising an I/O device; and a trusted agent to securely command the I/O device to enter a trusted I/O mode; securely command the I/O device to set a global lock on configuration registers of the I/O device in response to a secure command of the I/O device to enter the trusted I/O mode; receive configuration data indicative of the configuration registers of the I/O device in response to a securely command of the I/O device to set the global lock; securely command the I/O device to atomically release the global lock and set a fine-grained lock on one or more of the configuration registers in response to receipt of the configuration data; and provide the configuration data to a trusted execution environment of the computing device in response to a secure command of the I/O device to atomically release the global lock and set the fine-grained lock.

Example 2 includes the subject matter of Example 1, and wherein the I/O device is to receive a configuration command; determine whether the configuration command is restricted to the trusted agent; determine whether the configuration command is received from the trusted agent in response to a determination that the configuration command is restricted to the trusted agent; process the configuration command in response to a determination that the configuration command is not restricted to the trusted agent or a determination that the configuration command is received from the trusted agent; and reject the configuration command in response to the determination that the configuration command is restricted to the trusted agent and a determination that the configuration command is not received from the trusted agent.

Example 3 includes the subject matter of any of Examples 1 and 2, and wherein to determine whether the configuration command is restricted to the trusted agent comprises to determine whether the configuration command comprises a command to enter or exit the trusted I/O mode or a command to lock or unlock a configuration register.

Example 4 includes the subject matter of any of Examples 1-3, and wherein the I/O device is further to determine whether the I/O device is in the trusted I/O mode in response to the determination that the configuration command is not restricted to the trusted agent; determine whether a configuration register associated with the configuration command is locked in response to a determination that the I/O device is in the trusted I/O mode; and determine whether the configuration command is received from the trusted agent in response to a determination that the configuration register is locked; wherein to reject the configuration command further comprises to reject the configuration command in response to the determination that the configuration register is locked and a determination that the configuration command is not received from the trusted agent.

Example 5 includes the subject matter of any of Examples 1-4, and wherein the trusted agent is further to perform an attestation protocol with the I/O device to generate a device attestation report; verify the device attestation report; and securely provision the I/O device with a provisioning key in response to verification of the device attestation report.

Example 6 includes the subject matter of any of Examples 1-5, and wherein to securely command the I/O device comprises to protect a configuration command with the provisioning key; and the I/O device is to determine whether the configuration command is received from the trusted agent based on the provisioning key.

Example 7 includes the subject matter of any of Examples 1-6, and wherein the trusted agent is further to sign the device attestation report with a private key of the trusted agent to generate a signed device attestation report; include the signed device attestation report and a trusted agent attestation report in an attestation report; and provide the attestation report to the trusted execution environment.

Example 8 includes the subject matter of any of Examples 1-7, and wherein the trusted execution environment is to verify the attestation report; and request the trusted agent to prepare the I/O device for trusted I/O in response to verification of the attestation report; wherein to securely command the I/O device to enter the trusted I/O mode comprises to securely command the I/O device to enter the trusted I/O mode in response to a request to the trusted agent to prepare the I/O device for trusted I/O.

Example 9 includes the subject matter of any of Examples 1-8, and wherein the trusted execution environment is to verify the configuration data.

Example 10 includes the subject matter of any of Examples 1-9, and further including a virtual machine monitor, wherein to securely command the I/O device comprises to (i) protect a configuration command with a provisioning key, and (ii) provide the configuration command to the virtual machine monitor in response to protection of the configuration command; and the virtual machine monitor is to provide the configuration command to the I/O device.

Example 11 includes the subject matter of any of Examples 1-10, and wherein the trusted agent is further to determine whether the trusted execution environment has released the I/O device; and securely command the I/O device to release the fine-grained lock in response to a determination that the trusted execution environment has released the I/O device.

Example 12 includes the subject matter of any of Examples 1-11, and wherein the trusted agent is further to determine whether no other trusted execution environment is using the I/O device in response to the determination that the trusted execution environment has released the I/O device; and securely command the I/O device to exit the trusted I/O mode in response to a determination that no other trusted execution environment is using the I/O device.

Example 13 includes the subject matter of any of Examples 1-12, and further including a virtual machine monitor, wherein the trusted agent is further to receive a request to reclaim the I/O device from the virtual machine monitor; and request the trusted execution environment to release the I/O device in response to receipt of the request to reclaim the I/O device.

Example 14 includes the subject matter of any of Examples 1-13, and further including a virtual machine monitor to enforce an account permission assigned to the trusted agent.

Example 15 includes the subject matter of any of Examples 1-14, and wherein the trusted agent comprises a secure enclave established with secure enclave support of a processor of the computing device; and the trusted execution environment comprises a trust domain established with multi-key total memory encryption support of the processor.

Example 16 includes a method for secure device configuration, the method comprising securely commanding, by a trusted agent of a computing device, an I/O device of the computing device to enter a trusted I/O mode; securely commanding, by the trusted agent, the I/O device to set a global lock on configuration registers of the I/O device in response to securely commanding the I/O device to enter the trusted I/O mode; receiving, by the trusted agent, configuration data indicative of the configuration registers of the I/O device in response to securely commanding the I/O device to set the global lock; securely commanding, by the trusted agent, the I/O device to atomically release the global lock and set a fine-grained lock on one or more of the configuration registers in response to receiving the configuration data; and providing, by the trusted agent, the configuration data to a trusted execution environment of the computing device in response to securely commanding the I/O device to atomically release the global lock and set the fine-grained lock.

Example 17 includes the subject matter of Example 16, and further including receiving, by the I/O device, a configuration command; determining, by the I/O device, whether the configuration command is restricted to the trusted agent; determining, by the I/O device, whether the configuration command is received from the trusted agent in response to determining that the configuration command is restricted to the trusted agent; processing, by the I/O device, the configuration command in response to determining that the configuration command is not restricted to the trusted agent or determining that the configuration command is received from the trusted agent; and rejecting, by the I/O device, the configuration command in response to determining that the configuration command is restricted to the trusted agent and determining that the configuration command is not received from the trusted agent.

Example 18 includes the subject matter of any of Examples 16 and 17, and wherein determining whether the configuration command is restricted to the trusted agent comprises determining whether the configuration command comprises a command to enter or exit the trusted I/O mode or a command to lock or unlock a configuration register.

Example 19 includes the subject matter of any of Examples 16-18, and further including determining, by the I/O device, whether the I/O device is in the trusted I/O mode in response to determining that the configuration command is not restricted to the trusted agent; determining, by the I/O device, whether a configuration register associated with the configuration command is locked in response to determining that the I/O device is in the trusted I/O mode; and determining, by the I/O device, whether the configuration command is received from the trusted agent in response to determining that the configuration register is locked; wherein rejecting the configuration command further comprises rejecting the configuration command in response to determining that the configuration register is locked and determining that the configuration command is not received from the trusted agent.

Example 20 includes the subject matter of any of Examples 16-19, and further including performing, by the trusted agent, an attestation protocol with the I/O device to generate a device attestation report; verifying, by the trusted agent, the device attestation report; and securely provisioning, by the trusted agent, the I/O device with a provisioning key in response to verifying the device attestation report.

Example 21 includes the subject matter of any of Examples 16-20, and wherein securely commanding the I/O device comprises protecting, by the trusted agent, a configuration command with the provisioning key; and determining, by the I/O device, whether the configuration command is received from the trusted agent based on the provisioning key.

Example 22 includes the subject matter of any of Examples 16-21, and further including signing, by the trusted agent, the device attestation report with a private key of the trusted agent to generate a signed device attestation report; including, by the trusted agent, the signed device attestation report and a trusted agent attestation report in an attestation report; and providing, by the trusted agent, the attestation report to the trusted execution environment.

Example 23 includes the subject matter of any of Examples 16-22, and further including verifying, by the trusted execution environment, the attestation report; and requesting, by the trusted execution environment, the trusted agent to prepare the I/O device for trusted I/O in response to verifying the attestation report; wherein securely commanding the I/O device to enter the trusted I/O mode comprises securely commanding the I/O device to enter the trusted I/O mode in response to requesting the trusted agent to prepare the I/O device for trusted I/O.

Example 24 includes the subject matter of any of Examples 16-23, and further including verifying, by the trusted execution environment, the configuration data.

Example 25 includes the subject matter of any of Examples 16-24, and wherein securely commanding the I/O device comprises protecting, by the trusted agent, a configuration command with a provisioning key; providing, by the trusted agent, the configuration command to a virtual machine monitor in response to protecting the configuration command; and providing, by the virtual machine monitor, the configuration command to the I/O device.

Example 26 includes the subject matter of any of Examples 16-25, and further including determining, by the trusted agent, whether the trusted execution environment has released the I/O device; and securely commanding, by the trusted agent, the I/O device to release the fine-grained lock in response to determining that the trusted execution environment has released the I/O device.

Example 27 includes the subject matter of any of Examples 16-26, and further including determining, by the trusted agent, whether no other trusted execution environment is using the I/O device in response to determining that the trusted execution environment has released the I/O device; and securely commanding, by the trusted agent, the I/O device to exit the trusted I/O mode in response to determining that no other trusted execution environment is using the I/O device.

Example 28 includes the subject matter of any of Examples 16-27, and further including receiving, by the trusted agent, a request to reclaim the I/O device from a virtual machine monitor of the computing device; and requesting, by the trusted agent, the trusted execution environment to release the I/O device in response to receiving the request to reclaim the I/O device.

Example 29 includes the subject matter of any of Examples 16-28, and further including enforcing, by a virtual machine monitor of the computing device, an account permission assigned to the trusted agent.

Example 30 includes the subject matter of any of Examples 16-29, and wherein the trusted agent comprises a secure enclave established with secure enclave support of a processor of the computing device; and the trusted execution environment comprises a trust domain established with multi-key total memory encryption support of the processor.

Example 31 includes a computing device comprising a processor; and a memory having stored therein a plurality of instructions that when executed by the processor cause the computing device to perform the method of any of Examples 16-30.

Example 32 includes one or more non-transitory, computer readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for secure device configuration, the computing device comprising: an I/O device; and a trusted agent to: authenticate the I/O device of the computing device; perform an authenticated key exchange protocol with the I/O device in response to authentication of the I/O device; verify a device configuration report in response to performance of the authenticated key exchange protocol, wherein the device configuration report is indicative of configuration registers of the I/O device; and send the device configuration report to a trusted execution environment of the computing device in response to verification of the device configuration report.

Example 35 includes the subject matter of Example 34, and wherein the trusted agent is further to: provide a trusted agent attestation report to a trusted firmware component of the computing device; and perform an authenticated key exchange protocol with the trusted execution environment in response to providing of the trusted agent attestation report.

Example 36 includes the subject matter of any of Examples 34 and 35, and wherein the trusted agent comprises a trusted execution environment having a predetermined identity, wherein the predetermined entity is known to the trusted firmware component.

Example 37 includes the subject matter of any of Examples 34-36, and wherein: the trusted agent is further to receive a request to authenticate an I/O device from a host operating system of the computing device; and to authenticate the I/O device comprises to authenticate the I/O device in response to receipt of the request to authenticate the I/O device.

Example 38 includes the subject matter of any of Examples 34-37, and wherein: to receive the request to authenticate the I/O device comprises to receive a device certificate; and to authenticate the I/O device comprises to authenticate the I/O device with the device certificate.

Example 39 includes the subject matter of any of Examples 34-38, and wherein the host operating system is to: determine wherein the I/O device is capable of trusted I/O; and send the request to authenticate the I/O device to the trusted agent in response to a determination that the I/O device is capable of trusted I/O.

Example 40 includes the subject matter of any of Examples 34-39, and wherein: to perform the authenticated key exchange protocol with the I/O device comprises to provision a shared secret key to the I/O device; and to verify the device configuration report comprises to verify integrity of the device configuration report with the shared secret key.

Example 41 includes the subject matter of any of Examples 34-40, and wherein the trusted agent is further to receive the device configuration report from a host operating system of the computing device.

Example 42 includes the subject matter of any of Examples 34-41, and wherein the host operating system is to: command the I/O device to lock configuration of the I/O device; receive the device configuration report from the I/O device in response to commanding of the I/O device to lock the configuration; and provide the device configuration report to the trusted agent.

Example 43 includes the subject matter of any of Examples 34-42, and wherein: the host operating system is further to program the configuration of the I/O device; and to command the I/O device to lock the configuration comprises to command the I/O device to lock the configuration in response to programming of the configuration.

Example 44 includes the subject matter of any of Examples 34-43, and wherein: the trusted agent is further to determine whether the I/O device is assigned to a different trusted execution environment in response to verification of the device configuration report; the trusted agent is further to record a binding between the I/O device and the trusted execution environment in response to a determination that the I/O device is not assigned to a different trusted execution environment; and to send the device configuration report to the trusted execution environment further comprises to send the device configuration report to the trusted execution environment in response to recordation of the binding.

Example 45 includes the subject matter of any of Examples 34-44, and wherein the trusted agent is further to remove the binding between the I/O device and the trusted execution environment in response to release of the I/O device by the trusted execution environment.

Example 46 includes the subject matter of any of Examples 34-45, and wherein: the trusted agent is further to receive a request to reclaim the I/O device from a host operating system; the trusted agent is further to verify, with a trusted firmware component of the computing device, that the trusted execution environment is terminated in response to receipt of the request to reclaim the I/O device; and to remove the binding between the I/O device and the trusted execution environment further comprises to remove the binding between the I/O device and the trusted execution environment in response to verification that the trusted execution environment is terminated.

Example 47 includes the subject matter of any of Examples 34-46, and wherein the trusted agent is further to: receive a request to reclaim the I/O device from a host operating system; verify that the I/O device is removed from the computing device in response to receipt of the request to reclaim the I/O device; and remove the binding between the I/O device and the trusted execution environment in response to verification that the I/O device is removed.

Example 48 includes the subject matter of any of Examples 34-47, and wherein the trusted agent is further to provision a link encryption key to the I/O device in response to performance of the authenticated key exchange protocol with the I/O device.

Example 49 includes the subject matter of any of Examples 34-48, and wherein the trusted execution environment is to: receive the trusted agent attestation report from the trusted firmware component; and verify the trusted agent attestation report; wherein to perform the authenticated key exchange protocol with the trusted execution environment comprises to perform the authenticated key exchange protocol with the trusted execution environment in response to verification of the trusted agent attestation report.

Example 50 includes the subject matter of any of Examples 34-49, and wherein the trusted execution environment is to: verify the device configuration report in response to sending of the device configuration report; and perform trusted I/O with the I/O device in response to verification of the device configuration report.

Example 51 includes the subject matter of any of Examples 34-50, and wherein to perform the trusted I/O comprises to securely transfer, by the I/O device, I/O data with a link encryption key.

Example 52 includes the subject matter of any of Examples 34-51, and wherein to verify the device configuration report comprises to verify a device feature of the I/O device.

Example 53 includes the subject matter of any of Examples 34-52, and wherein to verify the device configuration report comprises to verify a register address indicated by the device configuration report.

Example 54 includes the subject matter of any of Examples 34-53, and wherein to verify the device configuration report comprises to verify a link encryption status indicated by the device configuration report.

Example 55 includes the subject matter of any of Examples 34-54, and wherein the trusted agent comprises a first trust domain and wherein the trusted execution environment comprises a second trust domain.

Example 56 includes a method for secure device configuration, the method comprising: authenticating, by a trusted agent of a computing device, an I/O device of the computing device; performing, by the trusted agent, an authenticated key exchange protocol with the I/O device in response to authenticating the I/O device; verifying, by the trusted agent, a device configuration report in response to performing the authenticated key exchange protocol, wherein the device configuration report is indicative of configuration registers of the I/O device; and sending, by the trusted agent, the device configuration report to a trusted execution environment of the computing device in response to verifying the device configuration report.

Example 57 includes the subject matter of Example 56, and further comprising: providing, by the trusted agent, a trusted agent attestation report to a trusted firmware component of the computing device; and performing, by the trusted agent, an authenticated key exchange protocol with a trusted execution environment of the computing device in response to providing the trusted agent attestation report.

Example 58 includes the subject matter of any of Examples 56 and 57, and wherein the trusted agent comprises a trusted execution environment having a predetermined identity, wherein the predetermined entity is known to the trusted firmware component.

Example 59 includes the subject matter of any of Examples 56-58, and further comprising: receiving, by the trusted agent, a request to authenticate an I/O device from a host operating system of the computing device; wherein authenticating the I/O device comprises authenticating the I/O device in response to receiving the request to authenticate the I/O device.

Example 60 includes the subject matter of any of Examples 56-59, and wherein: receiving the request to authenticate the I/O device comprises receiving a device certificate; and authenticating the I/O device comprises authenticating the I/O device with the device certificate.

Example 61 includes the subject matter of any of Examples 56-60, and further comprising: determining, by the host operating system, wherein the I/O device is capable of trusted I/O; and sending, by the host operating system, the request to authenticate the I/O device to the trusted agent in response to determining that the I/O device is capable of trusted I/O.

Example 62 includes the subject matter of any of Examples 56-61, and wherein: performing the authenticated key exchange protocol with the I/O device comprises provisioning a shared secret key to the I/O device; and verifying the device configuration report comprises verifying integrity of the device configuration report with the shared secret key.

Example 63 includes the subject matter of any of Examples 56-62, and further comprising receiving, by the trusted agent, the device configuration report from a host operating system of the computing device.

Example 64 includes the subject matter of any of Examples 56-63, and further comprising: commanding, by the host operating system, the I/O device to lock configuration of the I/O device; receiving, by the host operating system, the device configuration report from the I/O device in response to commanding the I/O device to lock the configuration; and providing, by the host operating system, the device configuration report to the trusted agent.

Example 65 includes the subject matter of any of Examples 56-64, and further comprising: programming, by the host operating system, the configuration of the I/O device; wherein commanding the I/O device to lock the configuration comprises commanding the I/O device to lock the configuration in response to programming the configuration.

Example 66 includes the subject matter of any of Examples 56-65, and further comprising: determining, by the trusted agent, whether the I/O device is assigned to a different trusted execution environment in response to verifying the device configuration report; and recording, by the trusted agent, a binding between the I/O device and the trusted execution environment in response to determining that the I/O device is not assigned to a different trusted execution environment; wherein sending the device configuration report to the trusted execution environment further comprises sending the device configuration report to the trusted execution environment in response to recording the binding.

Example 67 includes the subject matter of any of Examples 56-66, and further comprising removing, by the trusted agent, the binding between the I/O device and the trusted execution environment in response to the trusted execution environment releasing the I/O device.

Example 68 includes the subject matter of any of Examples 56-67, and further comprising: receiving, by the trusted agent, a request to reclaim the I/O device from a host operating system; and verifying, by the trusted agent with a trusted firmware component of the computing device, that the trusted execution environment is terminated in response to receiving the request to reclaim the I/O device; wherein removing the binding between the I/O device and the trusted execution environment further comprises removing the binding between the I/O device and the trusted execution environment in response to verifying that the trusted execution environment is terminated.

Example 69 includes the subject matter of any of Examples 56-68, and further comprising: receiving, by the trusted agent, a request to reclaim the I/O device from a host operating system; verifying, by the trusted agent, that the I/O device is removed from the computing device in response to receiving the request to reclaim the I/O device; and removing, by the trusted agent, the binding between the I/O device and the trusted execution environment in response to verifying that the I/O device is removed.

Example 70 includes the subject matter of any of Examples 56-69, and further comprising provisioning, by the trusted agent, a link encryption key to the I/O device in response to performing the authenticated key exchange protocol with the I/O device.

Example 71 includes the subject matter of any of Examples 56-70, and further comprising: receiving, by the trusted execution environment, the trusted agent attestation report from the trusted firmware component; and verifying, by the trusted execution environment, the trusted agent attestation report; wherein performing the authenticated key exchange protocol with the trusted execution environment comprises performing the authenticated key exchange protocol with the trusted execution environment in response to verifying the trusted agent attestation report.

Example 72 includes the subject matter of any of Examples 56-71, and further comprising: verifying, by the trusted execution environment, the device configuration report in response to sending the device configuration report; and performing, by the trusted execution environment, trusted I/O with the I/O device in response to verifying the device configuration report.

Example 73 includes the subject matter of any of Examples 56-72, and wherein performing the trusted I/O comprises securely transferring, by the I/O device, I/O data with a link encryption key.

Example 74 includes the subject matter of any of Examples 56-73, and wherein verifying the device configuration report comprises verifying a device feature of the I/O device.

Example 75 includes the subject matter of any of Examples 56-74, and wherein verifying the device configuration report comprises verifying a register address indicated by the device configuration report.

Example 76 includes the subject matter of any of Examples 56-75, and wherein verifying the device configuration report comprises verifying a link encryption status indicated by the device configuration report.

Example 77 includes the subject matter of any of Examples 56-76, and wherein the trusted agent comprises a first trust domain and wherein the trusted execution environment comprises a second trust domain.

Example 78 includes a computing device comprising a processor; and a memory having stored therein a plurality of instructions that when executed by the processor cause the computing device to perform the method of any of Examples 56-77.

Example 79 includes one or more non-transitory, computer readable storage media comprising a plurality of instructions stored thereon that in response to being executed result in a computing device performing the method of any of Examples 56-77.

Example 80 includes a computing device comprising means for performing the method of any of Examples 56-77.

The invention claimed is:

1. A computing device for secure device configuration, the computing device comprising:
   an input/output (I/O) device; and
   a trusted agent to:
      securely command the I/O device to enter a trusted I/O mode;
      securely command the I/O device to set a global lock on configuration registers of the I/O device in response to a secure command of the I/O device to enter the trusted I/O mode;
      receive configuration data indicative of the configuration registers of the I/O device in response to a securely command of the I/O device to set the global lock;
      securely command the I/O device to atomically release the global lock and set a fine-grained lock on one or more of the configuration registers in response to receipt of the configuration data; and
      provide the configuration data to a trusted execution environment of the computing device in response to a secure command of the I/O device to atomically release the global lock and set the fine-grained lock.

2. The computing device of claim 1, wherein the I/O device is to:
   receive a configuration command;
   determine whether the configuration command is restricted to the trusted agent;
   determine whether the configuration command is received from the trusted agent in response to a determination that the configuration command is restricted to the trusted agent;
   process the configuration command in response to a determination that the configuration command is not restricted to the trusted agent or a determination that the configuration command is received from the trusted agent; and reject the configuration command in response to the determination that the configuration command is restricted to the trusted agent and a determination that the configuration command is not received from the trusted agent.

3. The computing device of claim 2, wherein to determine whether the configuration command is restricted to the trusted agent comprises to determine whether the configuration command comprises a command to enter or exit the trusted I/O mode or a command to lock or unlock a configuration register.

4. The computing device of claim 2, wherein the I/O device is further to:
determine whether the I/O device is in the trusted I/O mode in response to the determination that the configuration command is not restricted to the trusted agent;
determine whether a configuration register associated with the configuration command is locked in response to a determination that the I/O device is in the trusted I/O mode; and
determine whether the configuration command is received from the trusted agent in response to a determination that the configuration register is locked;
wherein to reject the configuration command further comprises to reject the configuration command in response to the determination that the configuration register is locked and a determination that the configuration command is not received from the trusted agent.

5. The computing device of claim 1, wherein the trusted agent is further to:
perform an attestation protocol with the I/O device to generate a device attestation report;
verify the device attestation report; and
securely provision the I/O device with a provisioning key in response to verification of the device attestation report.

6. The computing device of claim 5, wherein:
to securely command the I/O device comprises to protect a configuration command with the provisioning key; and
the I/O device is to determine whether the configuration command is received from the trusted agent based on the provisioning key.

7. The computing device of claim 5, wherein the trusted agent is further to:
sign the device attestation report with a private key of the trusted agent to generate a signed device attestation report;
include the signed device attestation report and a trusted agent attestation report in an attestation report; and
provide the attestation report to the trusted execution environment.

8. The computing device of claim 7, wherein the trusted execution environment is to:
verify the attestation report; and
request the trusted agent to prepare the I/O device for trusted I/O in response to verification of the attestation report;
wherein to securely command the I/O device to enter the trusted I/O mode comprises to securely command the I/O device to enter the trusted I/O mode in response to a request to the trusted agent to prepare the I/O device for trusted I/O.

9. The computing device of claim 1, wherein the trusted execution environment is to verify the configuration data.

10. The computing device of claim 1, wherein the trusted agent is further to:
determine whether the trusted execution environment has released the I/O device; and
securely command the I/O device to release the fine-grained lock in response to a determination that the trusted execution environment has released the I/O device.

11. The computing device of claim 10, wherein the trusted agent is further to:
determine whether no other trusted execution environment is using the I/O device in response to the determination that the trusted execution environment has released the I/O device; and
securely command the I/O device to exit the trusted I/O mode in response to a determination that no other trusted execution environment is using the I/O device.

12. The computing device of claim 10, further comprising a virtual machine monitor, wherein the trusted agent is further to:
receive a request to reclaim the I/O device from the virtual machine monitor; and
request the trusted execution environment to release the I/O device in response to receipt of the request to reclaim the I/O device.

13. The computing device of claim 1, wherein:
the trusted agent comprises a secure enclave established with secure enclave support of a processor of the computing device; and
the trusted execution environment comprises a trust domain established with multi-key total memory encryption support of the processor.

14. A method for secure device configuration, the method comprising:
securely commanding, by a trusted agent of a computing device, an input/output (I/O) device of the computing device to enter a trusted I/O mode;
securely commanding, by the trusted agent, the I/O device to set a global lock on configuration registers of the I/O device in response to securely commanding the I/O device to enter the trusted I/O mode;
receiving, by the trusted agent, configuration data indicative of the configuration registers of the I/O device in response to securely commanding the I/O device to set the global lock;
securely commanding, by the trusted agent, the I/O device to atomically release the global lock and set a fine-grained lock on one or more of the configuration registers in response to receiving the configuration data; and
providing, by the trusted agent, the configuration data to a trusted execution environment of the computing device in response to securely commanding the I/O device to atomically release the global lock and set the fine-grained lock.

15. The method of claim 14, further comprising:
receiving, by the I/O device, a configuration command;
determining, by the I/O device, whether the configuration command is restricted to the trusted agent;
determining, by the I/O device, whether the configuration command is received from the trusted agent in response to determining that the configuration command is restricted to the trusted agent;
processing, by the I/O device, the configuration command in response to determining that the configuration command is not restricted to the trusted agent or determining that the configuration command is received from the trusted agent; and rejecting, by the I/O device, the configuration command in response to determining that the configuration command is restricted to the trusted agent and determining that the configuration command is not received from the trusted agent.

16. The method of claim 15, further comprising:

determining, by the I/O device, whether the I/O device is in the trusted I/O mode in response to determining that the configuration command is not restricted to the trusted agent;

determining, by the I/O device, whether a configuration register associated with the configuration command is locked in response to determining that the I/O device is in the trusted I/O mode; and determining, by the I/O device, whether the configuration command is received from the trusted agent in response to determining that the configuration register is locked;

wherein rejecting the configuration command further comprises rejecting the configuration command in response to determining that the configuration register is locked and determining that the configuration command is not received from the trusted agent.

17. The method of claim 14, further comprising:

performing, by the trusted agent, an attestation protocol with the I/O device to generate a device attestation report;

verifying, by the trusted agent, the device attestation report; and securely provisioning, by the trusted agent, the I/O device with a provisioning key in response to verifying the device attestation report.

18. The method of claim 17, wherein securely commanding the I/O device comprises:

protecting, by the trusted agent, a configuration command with the provisioning key; and determining, by the I/O device, whether the configuration command is received from the trusted agent based on the provisioning key.

19. The method of claim 14, further comprising:

determining, by the trusted agent, whether the trusted execution environment has released the I/O device; and securely commanding, by the trusted agent, the I/O device to release the fine-grained lock in response to determining that the trusted execution environment has released the I/O device.

20. One or more non-transitory computer-readable storage media comprising a plurality of instructions stored thereon that, in response to being executed, cause a computing device to:

securely command, by a trusted agent of the computing device, an input/output (I/O) device of the computing device to enter a trusted I/O mode;

securely command, by the trusted agent, the I/O device to set a global lock on configuration registers of the I/O device in response to securely commanding the I/O device to enter the trusted I/O mode;

receive, by the trusted agent, configuration data indicative of the configuration registers of the I/O device in response to securely commanding the I/O device to set the global lock;

securely command, by the trusted agent, the I/O device to atomically release the global lock and set a fine-grained lock on one or more of the configuration registers in response to receiving the configuration data; and provide, by the trusted agent, the configuration data to a trusted execution environment of the computing device in response to securely commanding the I/O device to atomically release the global lock and set the fine-grained lock.

21. The one or more non-transitory computer-readable storage media of claim 20, further comprising a plurality of instructions stored thereon that, in response to being executed, cause the computing device to:

receive, by the I/O device, a configuration command;

determine, by the I/O device, whether the configuration command is restricted to the trusted agent;

determine, by the I/O device, whether the configuration command is received from the trusted agent in response to determining that the configuration command is restricted to the trusted agent;

process, by the I/O device, the configuration command in response to determining that the configuration command is not restricted to the trusted agent or determining that the configuration command is received from the trusted agent; and reject, by the I/O device, the configuration command in response to determining that the configuration command is restricted to the trusted agent and determining that the configuration command is not received from the trusted agent.

22. The one or more non-transitory computer-readable storage media of claim 21, further comprising a plurality of instructions stored thereon that, in response to being executed, cause the computing device to:

determine, by the I/O device, whether the I/O device is in the trusted I/O mode in response to determining that the configuration command is not restricted to the trusted agent;

determine, by the I/O device, whether a configuration register associated with the configuration command is locked in response to determining that the I/O device is in the trusted I/O mode; and determine, by the I/O device, whether the configuration command is received from the trusted agent in response to determining that the configuration register is locked;

wherein to reject the configuration command further comprises to reject the configuration command in response to determining that the configuration register is locked and determining that the configuration command is not received from the trusted agent.

23. The one or more non-transitory computer-readable storage media of claim 20, further comprising a plurality of instructions stored thereon that, in response to being executed, cause the computing device to:

perform, by the trusted agent, an attestation protocol with the I/O device to generate a device attestation report;

verify, by the trusted agent, the device attestation report; and securely provision, by the trusted agent, the I/O device with a provisioning key in response to verifying the device attestation report.

24. The one or more non-transitory computer-readable storage media of claim 23, wherein to securely command the I/O device comprises to:

protect, by the trusted agent, a configuration command with the provisioning key; and determine, by the I/O device, whether the configuration command is received from the trusted agent based on the provisioning key.

25. The one or more non-transitory computer-readable storage media of claim 20, further comprising a plurality of instructions stored thereon that, in response to being executed, cause the computing device to:
    determine, by the trusted agent, whether the trusted execution environment has released the I/O device; and
    securely command, by the trusted agent, the I/O device to release the fine-grained lock in response to determining that the trusted execution environment has released the I/O device.

\* \* \* \* \*